United States Patent
Riggs et al.

(10) Patent No.: US 10,546,447 B2
(45) Date of Patent: Jan. 28, 2020

(54) APPARATUS AND METHODS FOR MONITORING AND FILTERING PLAYER INPUTS MADE IN A VIDEO GAMING SYSTEM

(71) Applicant: Everi Games, Inc., Austin, TX (US)

(72) Inventors: Keith Riggs, Austin, TX (US); Steven Meyer, Austin, TX (US); Loren Jacobs, Austin, TX (US); James McHugh, Austin, TX (US); Travis Bussey, Austin, TX (US)

(73) Assignee: Everi Games, Inc., Austin, TX (US)

( * ) Notice: Subject to any disclaimer, the term of this patent is extended or adjusted under 35 U.S.C. 154(b) by 82 days.

(21) Appl. No.: 15/717,699

(22) Filed: Sep. 27, 2017

(65) Prior Publication Data

US 2018/0018852 A1    Jan. 18, 2018

Related U.S. Application Data

(63) Continuation of application No. 15/703,396, filed on Sep. 13, 2017, which is a continuation of application
(Continued)

(51) Int. Cl.
| | |
|---|---|
| *H04L 29/06* | (2006.01) |
| *A63F 13/537* | (2014.01) |
| *G06F 3/0484* | (2013.01) |
| *G07F 17/32* | (2006.01) |
| *A63F 13/48* | (2014.01) |
| *A63F 13/22* | (2014.01) |

(Continued)

(52) U.S. Cl.
CPC .......... *G07F 17/3211* (2013.01); *A63F 13/22* (2014.09); *A63F 13/30* (2014.09); *A63F 13/352* (2014.09); *A63F 13/48* (2014.09); *G07F 17/3216* (2013.01); *G07F 17/3225* (2013.01); *G07F 17/3244* (2013.01); *G07F 17/3276* (2013.01)

(58) Field of Classification Search
CPC .................. A63F 13/75; G06F 21/316; G06F 2221/2133; H04W 12/00508
See application file for complete search history.

(56) References Cited

U.S. PATENT DOCUMENTS

| | | |
|---|---|---|
| 7,771,271 B2 | 8/2010 | Walker |
| 8,049,818 B2 | 11/2011 | Na |

(Continued)

*Primary Examiner* — Lawrence S Galka
(74) *Attorney, Agent, or Firm* — The Culbertson Group, P.C.

(57) ABSTRACT

A method includes receiving game command input signals on a game controller signal input path to a gaming device and splitting the game command input signals from the game controller signal input path onto a signal monitoring path. Game command data representing the game command input signals from the monitoring path are stored and used in evaluating two or more game control aspects associated with the game command data to produce a respective automation probability for each game control aspect. The respective automation probabilities for each game control aspect are combined to produce an overall automation probability value. A participation status of the player may then be modified in response to a characteristic of the overall automation probability value.

14 Claims, 13 Drawing Sheets

Related U.S. Application Data

No. 13/925,660, filed on Jun. 24, 2013, now Pat. No. 9,443,394.

(60) Provisional application No. 62/400,021, filed on Sep. 26, 2016.

(51) Int. Cl.
*A63F 13/30* (2014.01)
*A63F 13/352* (2014.01)

(56) References Cited

U.S. PATENT DOCUMENTS

| | | |
|---|---|---|
| 2002/0123376 A1 | 9/2002 | Walker |
| 2007/0024749 A1 | 2/2007 | Na |
| 2009/0221365 A1 | 9/2009 | Levy |
| 2012/0083331 A1 | 4/2012 | Carpenter |
| 2013/0198334 A1 | 8/2013 | Ikenaga |
| 2014/0317566 A1 | 10/2014 | Ohara |
| 2014/0317744 A1* | 10/2014 | Turgeman ............ H04L 63/1408 726/23 |
| 2016/0028730 A1* | 1/2016 | Natarajan ................ G06F 21/31 726/6 |
| 2016/0110903 A1* | 4/2016 | Perrin ..................... H04L 67/38 345/634 |
| 2016/0306974 A1* | 10/2016 | Turgennan .......... G06Q 20/4016 |
| 2017/0078319 A1* | 3/2017 | Thompson .......... H04L 63/1433 |
| 2018/0077180 A1* | 3/2018 | Zhang ................ H04L 63/1425 |

\* cited by examiner

APPARATUS AND METHODS FOR MONITORING AND FILTERING PLAYER INPUTS MADE IN A VIDEO GAMING SYSTEM

CROSS-REFERENCE TO RELATED APPLICATION

This application is a continuation of U.S. patent application Ser. No. 15/703,396 filed Sep. 13, 2017 and entitled "Apparatus and Methods for Facilitating Wagering on Games Conducted on an Independent Video Gaming system. This application also claims the benefit, under 35 U.S.C. § 119(e), of U.S. Provisional Patent Application No. 62/400,021 filed Sep. 26, 2016 and entitled "Sports Tournament Gaming System and Method." The entire content of each of these applications is incorporated herein by this reference. The entire content of U.S. Pat. No. 9,443,394 entitled "Convertible In-Revenue and Out-of-Revenue Gaming System and Method with a Real-Time Streaming Video Feed and Display" is also incorporated herein by this reference.

COPYRIGHT NOTICE

A portion of the disclosure of this patent document contains material which is subject to copyright protection. The copyright owner has no objection to the facsimile reproduction of the patent document or the patent disclosure, as it appears in the U.S. Patent and Trademark Office records, but otherwise reserves all rights of copyright whatsoever.

TECHNICAL FIELD OF THE INVENTION

The invention relates to devices and methods for facilitating wagering on games conducted through independent gaming systems. More particularly, the invention relates to devices and methods for monitoring and filtering inputs made through game controllers in such systems. The invention also encompasses program products which may be executed to monitor and filter inputs made through game controllers in gaming systems.

BACKGROUND OF THE INVENTION

Wagering has long been popular through various gaming machines such as reel-type gaming machines (in which results are displayed via video-simulated or physical reels), electronic poker machines, electronic pachinko machines, and other gaming machines. In these types of gaming machines, a player places a wager at the gaming machine, activates the gaming machine for the wager, and the wager is resolved based on the result obtained for that activation of the game. This resolution may include the award of cash, credits, points, or other value in view of a result defined as a winning result for the game. Otherwise, the resolution for the wager may include the loss of the wager amount in view of a result defined as a losing result for the game. Some electronic gaming machines offer the ability to place additional wagers on different games offered concurrently on the gaming machine, while other gaming machines provide the chance at additional prizes for bonus games conducted within the framework of the original game for which the original wager was placed. Additionally, some electronic gaming systems allow competitive play in tournaments or otherwise in which players or teams of players compete against each other using some sort of scoring system. This competitive play may be "in-revenue" in which players must still enter wagers for the various plays in the underlying game, or "out-of-revenue" in which players or teams pay an entry fee in order to participate in the tournament, and no wagers are required on the plays in the underlying games.

Beyond the traditional wagering games conducted through electronic gaming machines, various video gaming systems have been developed for video games such as MORTAL KOMBAT®, MADDEN NFL®, SUPER SMASH BROS.®, and many more. Video game genres include real-time strategy games, fighting games, first-person shooter (FPS) games, and multiplayer online battle arena (MOBA) games. Popular video gaming systems (also referred to as "gaming platforms") include the various XBOX® and PLAYSTATION® products, which employ a dedicated game console connected to a suitable monitor and game controller. The game console includes a suitable processing system to execute video game program code, receive player inputs entered through the game controller, and generate a game video signal that is directed to the connected video monitor to display the game graphics over the course of play in the given game. General purpose computers such as PCs represent another type of video gaming system which facilitates high levels of customization in terms of video display and player control input. Regardless of the video gaming system, the video games may be conducted locally with the local player playing against the game (or a game-controlled character) or competing with another local player. Video games may also be conducted over a wide area network with various players competing from gaming consoles at different geographic locations.

With the wide popularity of video gaming, video gaming competitions commonly referred to as e-sports have also become very popular. E-sports competitions may be organized as tournaments conducted through various venues which accommodate spectators and which are televised or available on streaming media platforms to viewers at any location where suitable Internet access is available. E-sports competitions are offered on both an amateur and professional level, and wagering on e-sports matches is available through various e-sports betting books similar to betting books for traditional sports such as horse racing.

Video game competitions, either private competitions between recreational gamers or e-sports competitions, require some degree of manual setup regardless of the particular video gaming system. Generally, once the game software is executed on the console or other device, the player must make inputs through the given platform to request entry into a game, and must commonly manually enter other setup inputs (such as selecting maps/arenas, characters, weapons, or tools) to prepare for the conduct of the game prior to the actual game play. This sort of manual entry and setup makes it difficult to administer tournaments particularly outside of an e-sports venue. Furthermore, results of the games must be manually collected, and this manual collection slows and limits wagering options for the games.

Particularly where wagering is involved, it is desirable to ensure that the players in e-sports contests play fairly, relying on their own skill rather than automated technical aids. The use of automated technical aids by players participating in e-sports contests can greatly change the odds of various results occurring in the games.

Using e-sports competitions as a basis for wagering may also change how games are conducted as contrasted to a non-wagering situation, particularly with regard to commands available in the game. Yet it is impractical and undesirable to require programming changes in games to be used as a basis for wagering.

SUMMARY OF THE INVENTION

The various aspects of the present invention are directed to methods and apparatus that monitor inputs made by players in an e-sports competition so that the use of automated technical aids may be detected and appropriate corrective action taken. Other aspects of the present invention are directed to methods and apparatus for selectively blocking inputs by e-sports players to ensure the proper conduct of the games. Implementations of the present invention facilitate the desired filtering and control without any need for an application programming interface to the underlying video games, and are thus essentially independent of the video game program code and video gaming system.

Methods according to a first aspect of the invention includes receiving game command input signals on a game controller signal input path to a gaming device and splitting the game command input signals from the game controller signal input path onto a signal monitoring path. The game command input signals comprise signals associated with a player and are operable for controlling play in a video game for the player such as by controlling the player's character (for example to shoot, punch, kick, block, etc.). These methods further include storing game command data representing the game command input signals from the monitoring path. The stored game command data is stored in a suitable data storage system and used in evaluating two or more game control aspects associated with the game command data to produce a respective automation probability for each game control aspect. Methods according to this first aspect of the invention also include combining the respective automation probability for each game control aspect to produce an overall automation probability value. A participation status of the player may then be modified in response to a characteristic of the overall automation probability value. In particular, a player may be disqualified for the game in which automation was detected or may banned from play in the future.

The game command input signals received according to this first aspect of the invention may be any and all valid control signals that a player may input in the course of game play. For a combat type game, the game command input signals might be a string of signals that would be interpreted by the video game as commands for the player's character to punch, kick, block, jump, crouch, shoot, reload, or take any other string of actions. Of course, the game command input signals represent a stream of individual commands ostensibly entered by the player through some authorized game controller device. Each input (to punch, kick, etc.) made in a game will, of course, be represented by a set of signals for transmission to the gaming device, and these combine to produce the game command input signals. By evaluating the game command data representing the player input signals, that is, game command input signals, to produce the individual automation probabilities and then combining these individual probabilities according to this aspect of the invention, it may be possible to detect players who are using certain prohibited aids in the course of play such as "aim bots" and other automated aids that can affect the player's performance in the game.

In various embodiments according to this first and other aspects of the invention, the game control aspects used to produce the various automation probabilities may be any aspects of the game control inputs by the player that may provide an indication automation may be involved in the inputs. For example, the game control aspects associated with the game command data may be any two or more of input speed, rate of input mistakes, variance between inputs, and input timing. It is also possible that each of these aspects may be used to produce an automation probability, and these may all be combined to produce the overall automation probability. As used in this disclosure and the claims, input speed may refer to the rate at which inputs (such as punch, kick, and block commands) are received from the player. Rates above a certain value may indicate prohibited automation and thus increase the automation probability for that game control aspect. The rate of input mistakes such as aiming errors, blocking errors may similarly provide an indication of prohibited automation. Variance between inputs, for example, variances or lack thereof between the speed of kicks or punches, may similarly indicate a probability of prohibited automation, as may input timing.

The characteristic of the overall automation probability value that may be used as a basis for modifying the player's participation status may include any suitable characteristic. In particular, the characteristic may be a relationship between the overall automation probability value and a threshold value that has been shown empirically or otherwise to indicate impermissible automation.

Another aspect of the present invention encompasses an input monitor for a video gaming device. An input monitor according to this aspect includes a signal splitter connected in a game controller input signal path between a game controller input point and an input port of a gaming device. This signal splitter is operable to direct game command input signals on the game controller input signal path onto a signal monitoring path. A data storage device under suitable data processor control is operatively connected to store game command data representing the game command input signals from the signal monitoring path. Two or more evaluation units are operatively connected to read the game command data stored on the data storage device, and each evaluation unit is operable to evaluate a respective game control aspect associated with the game command data and to produce a respective automation probability for the respective game control aspect. A monitoring device according to this aspect of the invention also includes a probability combination unit operatively connected to receive the respective automation probability for each respective game control aspect. The probability combination unit is operable to combine the respective automation probability for each game control aspect to produce an overall automation probability value which may be acted upon as described above in connection with the first aspect of the invention. The variations and features of the evaluation and game control aspects described above in connection with the methods apply also to this monitoring device aspect of the invention.

Because the methods and devices of the foregoing aspects of the invention may be implemented using processing devices operating under suitable program code, other aspects of the present invention encompass program products comprising one or more non-transitory computer readable data storage devices storing program code. A program product according to these aspects of the invention store program code including game command data storage program, evaluation program code, and combination program code. The game command data storage program code is executable to receive game command signals and to store game command data as described in connection with methods of the invention. The evaluation program code is executable to evaluate two or more game control aspects associated with the game command data as described above, while the combination program code is executable to combine the respective automation probability for each game control aspect to produce the overall automation probability value.

Another aspect of the invention encompasses a method of filtering inputs to a video gaming device, particularly to prevent inputs that might be supported by the gaming device, but might be inappropriate at least at certain times in the course of a video game competition such as one on which wagers are placed. Examples of such inappropriate inputs are the "pause" command and "exit" command. Certain game play commands such as certain attacks in combat games may be deemed inappropriate in certain instances as well.

Methods according to this aspect of the invention include receiving game command input signals in the course of a video game conducted on a video gaming device. The received game command input signals represent a command input defined by the video game as a valid input at a time at which the game command input signals is received. Methods according to this aspect of the invention further include determining if the command input is included in a set of prohibited inputs for the video game at the time at which the game command input signals are received. This set of prohibited inputs is defined by a system external to the video gaming device, such as by an e-sport gaming device supporting wagering as will be described below. In the event the command input is not included in the set of prohibited inputs for the video game at the time at which the game command input signals are received, methods according to this aspect of the invention include transmitting a replicated signal corresponding to the game command input signals to the video gaming device. Thus in this case the gaming device receives the input to continue play with only a small and imperceptible delay occasioned by the determination as to whether or not the command input is included in the set of prohibited inputs. In the event the command input is included in the set of prohibited inputs at the time at which the game command input signals is received, methods according to this aspect of the invention may include storing a record of the command input represented by the game command input signals without transmitting a signal corresponding to the game command input signals to the video gaming device. This in this case, the game command input signals are effectively blocked from reaching the gaming device.

A further aspect of the invention includes a button filter apparatus for a video game system. The button filter apparatus includes a data processing device and memory accessible by the data processing device. The data processing device is interposed between an input port of a video game system and a game controller and is operable to receive game command input signals communicated from the game controller to the video gaming device in the course of the video game. The game command input signals represent a command input defined by the video game as a valid input (such as a "pause" input) at a time at which the game command input signals are received by the data processing device. The memory is operable under the control of the data processing device to store data representing the command input. In a button filter apparatus according to this aspect of the invention the data processing device is further operable to compare the stored data representing the command input to a first set of command input records to determine if the command input is included in the set of prohibited inputs for the video game as described in the filtering method above. Depending upon the result of this comparison as described for the method, the data processing device is operable to cause the replicated signal to be transmitted to the video gaming device or to store a record of the command input without transmitting a corresponding signal corresponding to the video gaming device.

According to either of the above button filtering aspects of the invention the process of determining if the command input is included in the set of prohibited inputs may include storing data representing the command input in a memory device and comparing the stored data representing the command input to a first set of command input records. The comparison may be to locate (or not locate) the command input in a list of approved or prohibited command inputs at that time. The aspects of button filtering may also include storing multiple different sets of command input records, each to be used in the comparison process when the game is in a particular state. This accounts for situations in which certain inputs might be prohibited in an e-sports system in which the game is in one state, and not prohibited when the game is in another state.

Because the button filtering methods and apparatus may be implemented using data processing devices operable under the control of program code, another aspect of the invention includes a button filtering program product comprising one or more computer readable non-transitory data storage devices storing program code. The program code in this case includes signal receiving and buffering program code to perform the signal receiving and storing functions described above. Button evaluation program code is executable to determine if the buffered data representing the game command input signals is included in the externally defined set of prohibited inputs. Routing program code is included to cause a replicated signal to be transmitted to the video gaming device in the event the command input is not included in the set of prohibited inputs, and to cause the command input data to be stored if the input is prohibited as described above, without transmitting the command on to the gaming device.

These and other advantages and features of the invention will be apparent from the following description of representative embodiments, considered along with the accompanying drawings.

DESCRIPTION OF REPRESENTATIVE EMBODIMENTS

Figure 1:
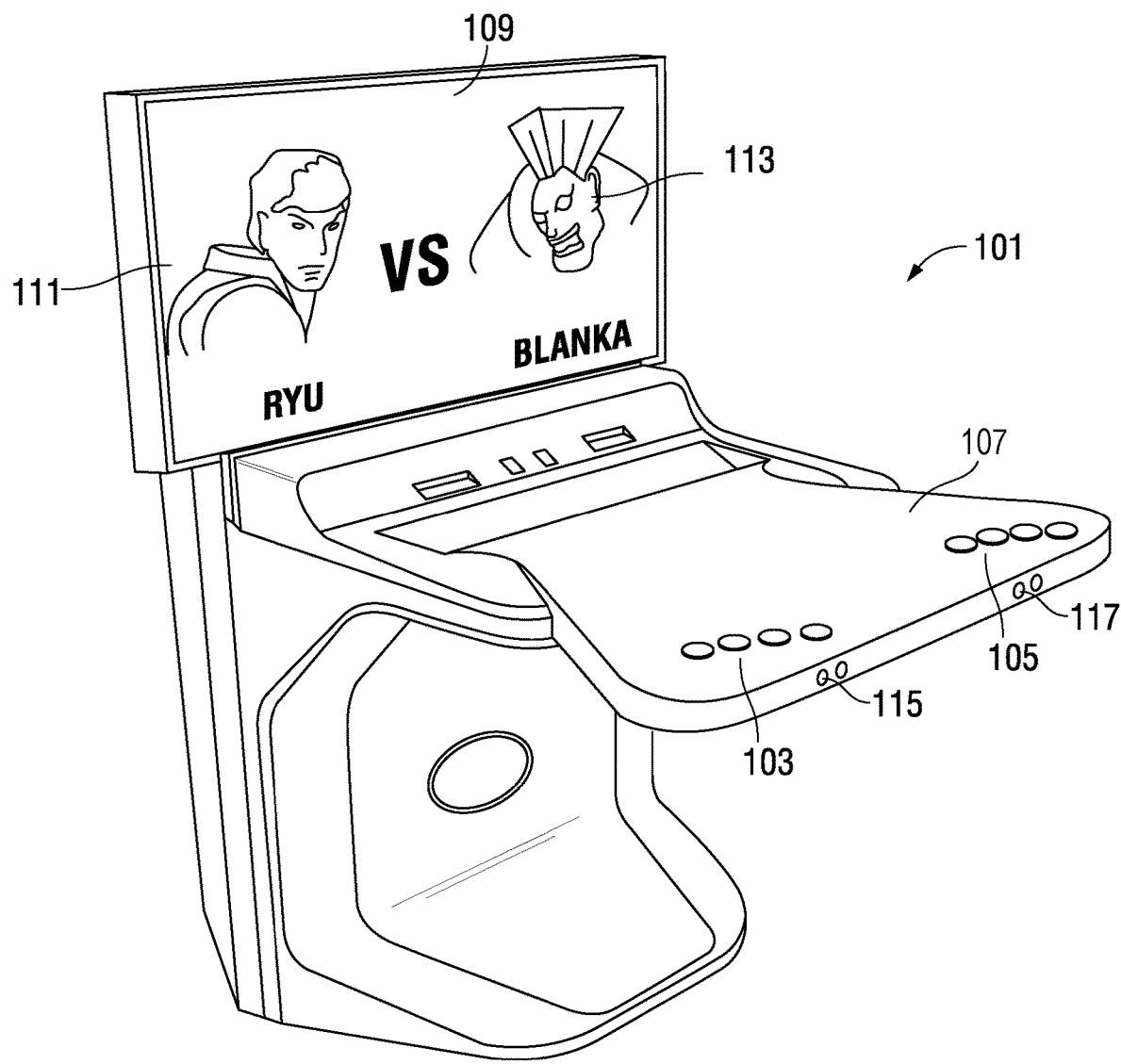
FIG. 1 is a view in perspective of an example gaming machine configurable to provide one or more games on a video gaming system in accordance with one or more embodiments encompassed under the present invention.

Referring to FIG. 1, an example gaming machine 101 is configured to allow two players to play a video game against each other and/or against players competing through other gaming machines of a video gaming system. To accommodate two players, example gaming machine 101 includes dual player button decks 103 and 105 located on a button deck support 107 so that the players may position themselves either sitting or standing to face the display screen 109 of the gaming machine. Display screen 109 is illustrated showing an interactive competition game with game characters (also referred to as "avatars") 111 and 113. Each player button deck 103 and 105 includes controls that enable a respective player to provide player inputs in the course of the game such as to control their respective character's movements, attacks, defenses, and perhaps other actions or activity in the course of the game so as to accumulate points or otherwise compete in the game. One or more jacks 115 may be provided in addition to player button deck 103 and one or more jacks 117 may be provided in addition to player button deck 105. These jacks 115 and 117 may be positioned on the front edge of button deck support 107, under that support, or at any other convenient location, and may comprise universal I/O connectors or gaming platform-specific connectors. Jacks 115 and 117 enable each player to connect a game controller device (e.g. game controller 317 shown in FIGS. 3 and 4) and use the game controller device to provide player inputs to the game.

Figure 2:
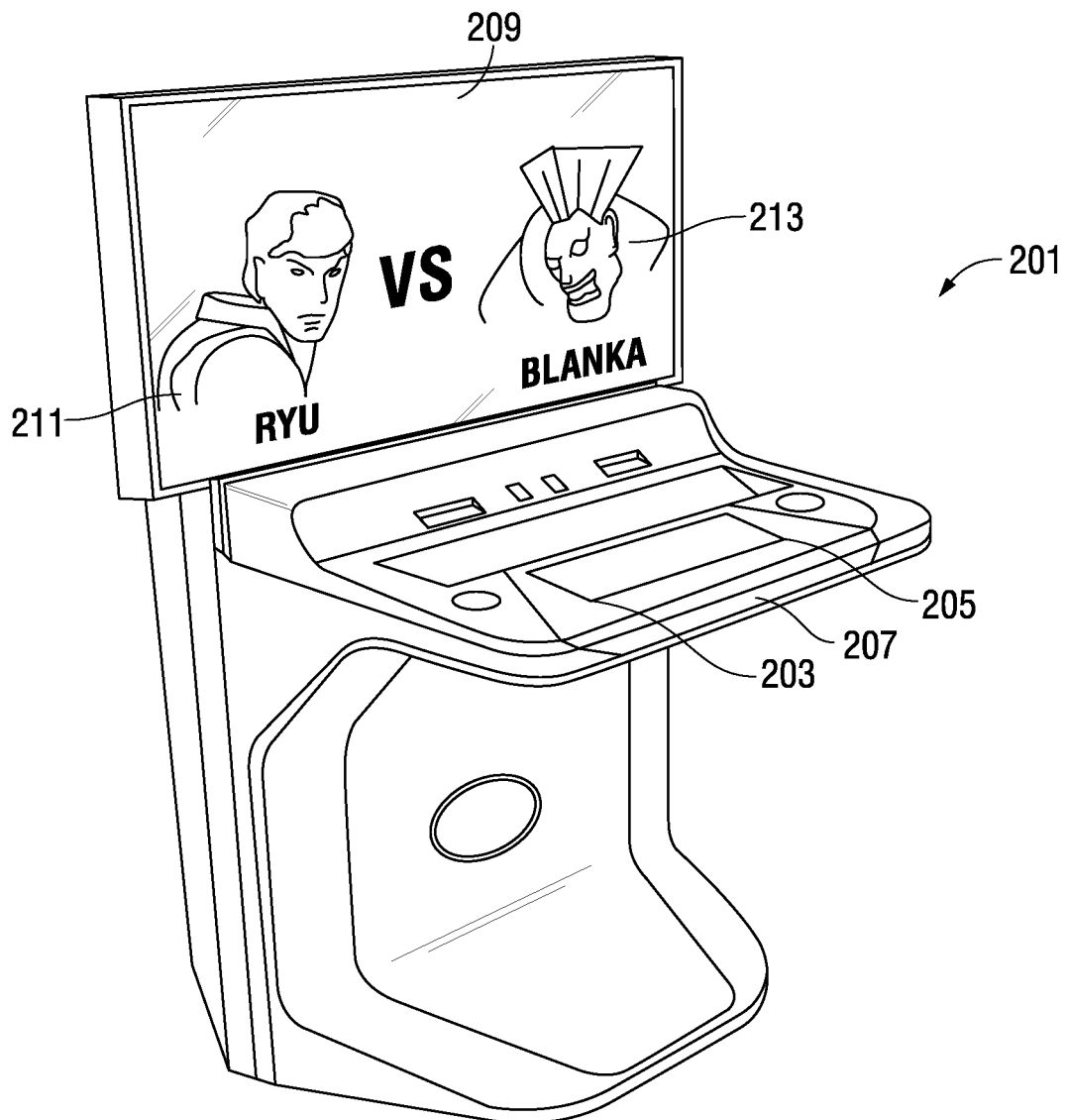
FIG. 2 is a view in perspective of another gaming machine configurable to provide one or more games on a video gaming system in accordance with one or more embodiments.

FIG. 2 shows an alternative gaming machine 201, similar to gaming machine 101, but placing player button decks 203 and 205 in a more central location of button deck support 207. Gaming machine 201 includes display screen 209 shown in this example as displaying game characters 211 and 213. Jacks (not shown) may also be included in gaming machine 201 corresponding to jacks 115 and 117 shown in the example of FIG. 1. Although both gaming machines 101 and 201 include dual button panels to facilitate two-player gaming at the gaming machine, both gaming machines may be configured to allow only a single player to play games through the respective gaming machine. Of course, other gaming machine embodiments according to the various aspects of the present invention may be configured only for single-player play at that gaming machine or for more than two players.

As will be discussed in more detail below, the games available through the example gaming machines 101 and 201 may be games that are played through popular video gaming systems such as the various generation XBOX® platforms and the various generation PLAYSTATION® platforms. The example characters 111, 113, 211, and 213 are game characters from the STREET FIGHTER® game series which includes titles for the XBOX® and PLAYSTATION® platforms, and well as for PC. In order to facilitate play through these popular video game systems, gaming machines 101 and 201 include at least one gaming console for one of these systems. For example, gaming machine 101 may house an XBOX ONE® console. It is also possible that a gaming machine such as gaming machine 101 houses multiple different video gaming system consoles to accommodate player preferences. Controls shown for gaming machines 101 and 201, such as at least some of the buttons included in button panels 103 and 105 in FIG. 1, and the devices which may be connected to jacks 115 and 117 in FIG. 1, may be controls which provide inputs to the one or more video gaming system consoles included in the gaming machine. Regardless of the gaming device or gaming devices included in the gaming machine, some aspects of the present invention facilitate wagering on various results that may be obtained in these games. Other aspects of the present invention facilitate control of games conducted through these video gaming systems to allow extra-platform control of tournaments (that is, control from outside of the platform).

Figure 3:
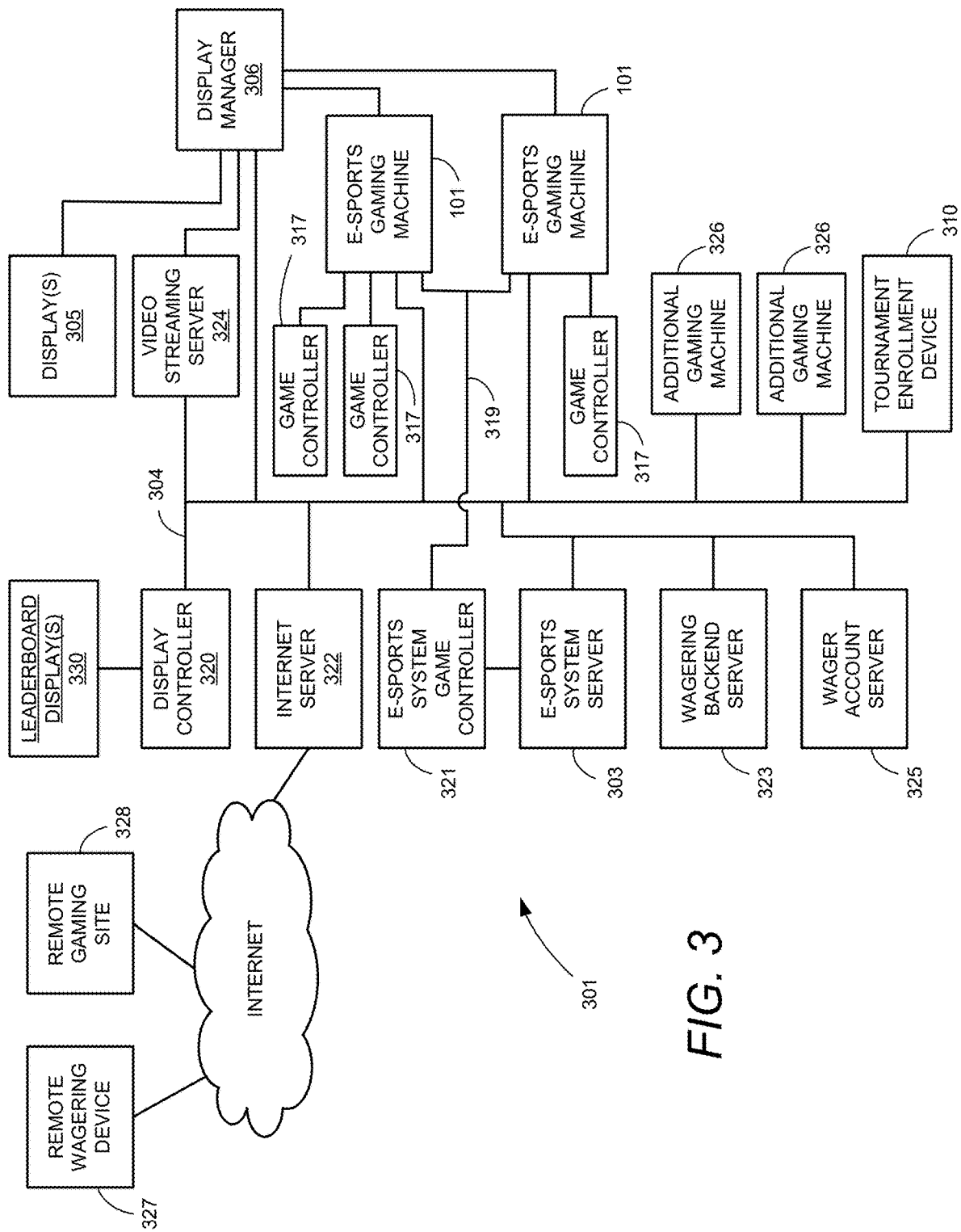
FIG. 3 is a block diagram illustrating a gaming system embodying aspects of the present invention.

FIG. 3 illustrates an example e-sports gaming system 301 configurable to provide one or more competitive games which may support tournament play and wagering in accordance with one or more embodiments. E-sports gaming system 301 includes one or more e-sports gaming machines 101 connected to e-sports system server 303 through a suitable network 304 which may comprise any suitable wired and/or wireless network. E-sports gaming machines 101 are also connected to an e-sports system game controller (which may be referred to as a "virtual game controller") 321 which is illustrated in this example system 301 as having a communication path 319 separate from the network 304. The nature of the communications to and from e-sports gaming machine 101 will be described further below particularly in connection with FIG. 4.

E-sports gaming system 301 further includes a wagering backend server 223, a wager account server 325, Internet server 322, video streaming server 324, display manager 306, and additional gaming devices 326. These additional devices are preferably interconnected in network 304.

E-sports gaming machines 101 are also each connected to one or more game controllers 317 and to the display manager 306. The connection between each game controller 317 and the respective e-sports gaming machine 101 may be through a respective jack associated with the e-sports gaming machine such as jacks 115 and 117 shown in FIG. 1. As discussed in connection with FIG. 1 above, the game controllers which allow a player to make game control player inputs in the course of a video game conducted through the e-sports gaming machine 101 may also be integrated into the e-sports gaming machine and may comprise the control panels 103 and 105 as shown in FIG. 1. The connection to display manager 306 may be any suitable connection for communicating a video signal output from gaming machine 101 to display manager 306. For example, the connection between a given gaming machine 101 and display manager may comprise an HDMI, VGA, or some other connection through which a video signal (or data from which a video signal may be generated) may be communicated. Display manager 306 may direct the video signal in the appropriate format to displays 305 to allow patrons to watch e-sports games in real time and to watch replays and recasts of e-sports games.

FIG. 3 also shows that e-sports gaming system 301 may communicate with external devices such as a remote wagering device 327 or a remote gaming site 328 which may itself include numerous wagering devices. FIG. 3 shows these external devices and systems connected over the Internet, however, any communications link may be employed to support the communications described further below, particularly in connection with the flowchart of FIG. 5.

E-sports system 301 supports the play of e-sports games particularly through popular video gaming systems and facilitates wagering on various results that may occur in these games. For example, a player may login to a video gaming system supported at e-sports gaming machine 101 and play a game on that platform. The play may be competitive against one or more other players or may be against an AI (game-controlled character) supported by the game. In other types of games the player or players may traverse an obstacle course or track and compete to produce the best score determined by any suitable metric or combination of metrics. The player may also enter wagers on various results that may occur in the game such as point totals, times (in clocked racing games for example), either at the completion of a game or at some point within the course of a game. System users other than the player may also wager on one or more results that may occur in the game, and these results may or may not be the same results on which a video game player places a wager. The results on which wagers may be placed will be discussed further below in connection with FIGS. 5-8. The other user may be a player also participating in the same game through another gaming machine 101 or through any other gaming device with connectivity to the network supported by the video gaming system, or may be a spectator with respect to the video game played through e-sports gaming machine 101 such as a user at another gaming machine which supports e-sports wagers or a local wagering device 326 in FIG. 3, or a remote wagering device such as device 327 or a device at a remote gaming site such as site 328.

E-sports system server 303 may function in system 301 to set up, initiate, and monitor, games played on e-sports gaming machines 101. E-sports system server 303 may also (in cooperation with wagering backend server 323 and wager account server 325) determine and award payouts for wager-determinant conditions detected in the games played on the e-sports gaming machines. Although system 301 may allow players to select players against which they compete in a given game conducted through e-sports gaming machines 101, and may allow manual set up and initiation of games, embodiments of the system may facilitate e-sports tournaments that are set up and initiated by or through e-sports system server 303 functioning alone or with other elements in the system as a tournament processing device. For e-sports tournaments conducted through system 301, a player may sign up or enroll for a tournament through a player enrollment device 310 where a player may input player information, such as by sliding a player card, driver's license or other readable ID card or by using a keypad to enter requested information, and pay a fee, if required. Such a player enrollment device may be attended by a casino employee, or may be an unattended, self-service device. The player enrollment device functions may also be implemented in a gaming machine 101, additional gaming machine 326, or at a remote device or system such as remote wagering device 327 or a device at remote gaming site 328. Regardless of how and where the player information is entered, the information is transmitted to the e-sports system server 303. An operator of e-sports system 301 may organize one or more tournaments for simultaneous processing by tournament system server 303 and organize the enrolled players according to the tournaments that the players have been signed up to play. Players may be called to play a given round of a tournament at selected times or they may be able to play on a first come first serve basis depending upon the tournament. At selected times, e-sports system server 303 may transmit selected player information to selected e-sports gaming machines 101 to be displayed on respective display screens 109 or other display screens associated with the gaming machines 101 to identify one or more competitors, such as two competitors for a two-person gaming machine 101, at the respective gaming machines 101. E-sports system server 303 may also transmit one or more instructions to each participating gaming machine 101 to select the particular tournament game to be played and initiate play at the participating gaming machine 101. These communications to select a particular tournament game and initiate play, or any other communications that must be executed by the video gaming device included in the gaming machine, may be performed through e-sports virtual game controller 321 as will be described further below. The player information may also be displayed on selected external displays 305 to enable spectators and bettors to see who is competing and what the game is to be played. Processes for setting up and controlling tournaments through e-sports system server 303 will be described in further detail below in connection with the flow diagram of FIG. 9. Where e-sports system server 303 administers e-sports tournaments, it may also maintain tournament player scores and rankings in the fashion disclosed in incorporated U.S. Pat. No. 9,443,394. Current rankings in tournaments may be communicated to display controller 320 for controlling one or more displays 330 to display leaderboard information such as current leaders. Display controller 320 may also cause video of the e-sports game players to be displayed at leaderboard displays 330 similarly to the player video displayed as described in U.S. Pat. No. 9,443,394.

Wagering backend server 323 functions in system 301 to provide probabilities for various results which may happen in games played through the system. In particular, wagering backend server 323 may provide predictive analytics based on past activity of game play to determine the probability of results happening in a game played through system 301 and on which a wager may be placed. In some cases result probabilities provided by wagering backend server may not be based on past game play or may be based only partially on past game play, and may be generated in some other suitable fashion.

Wager account server 325 in FIG. 3 functions to support user accounts for facilitating wagering activity. Generally, a user wishing to place wagers in e-sports system 301 will establish an account maintained by wager account server 325, and will have some value (either monetary value or conceivably non-monetary value such as player points) in the account. Wagering accounts may be opened and maintained in any suitable way. For example, users may be allowed to open and fund an account remotely through an Internet web page or through a tournament enrollment device 310. E-sports gaming machines 101, and other gaming machines such as gaming machine 326, may also include features to allow a user to fund a wagering account maintained through wager account server 325. Some implementations of system 301 may also allow wager funding on a wager-by-wager basis through a user's credit or debit card and/or through some other credit or funding mechanism. Wagers placed in the system 301 may be deducted from the user's account maintained through account server 325, and any winnings may be credited to that account.

Additional gaming devices 326 may comprise and gaming machines providing reel-type or other wagering games. These additional gaming machines may or may not allow play in e-sports games, but may allow wagers placed on e-sports games conducted by players on gaming machines 101. Gaming machine 326 may display an e-sports competition on one or more of the displays associated with that gaming machine while the player at that machine plays a standard wagering game such as a video card game or a reel-type game, for example. The player at a gaming machine 326 may be enabled to bet on any result in the displayed e-sports game conducted through gaming machine 101, such as the winner or loser of the e-sports game or the number of points scored by one or more competitors in the e-sports game, or some other final or interim result for which wagering is supported through the wagering backend server 323.

Remote wagering device 327 may comprise any suitable device through which wagers may be placed on e-sports games conducted through gaming machines 101. For example, 327 may be a smart phone, tablet, laptop, or PC running an application that enables a user to view a wagering screen and place bets on results in e-sports games played through gaming machines 101 or through a gaming machine 101 and one or more other gaming devices on the given video gaming system (that is, gaming devices which may or may not be included in a gaming machine 101 or in system 301). Alternatively, remote wagering device 327 may comprise a wagering kiosk that provides a wagering interface through which a user may place bets on results in e-sports games played through gaming machines 101 or through a gaming machine 101 and one or more other gaming devices. Remote wagering device 327 may also receive and display streaming video of e-sports games monitored through e-sports gaming system 301.

Remote gaming site 328 may comprise a casino or other wagering facility having e-sports wagering kiosks or e-sports wagering-enabled gaming machines such as gaming machine 326. Displays at remote gaming site 328 (which may include displays associated with e-sports wagering-enabled gaming machines and other devices at the remote gaming site), may display e-sports games which are monitored through system 301 to allow the remote users to follow the action in the e-sports games, particularly those on which the users have placed wagers. Remote gaming site 328 may also include gaming machines such as gaming machines 101 through which e-sports games are played.

Video streaming server 324 is included in system 301 to provide video streams of e-sports games that are monitored by the system and on which wagers may be placed according to aspects of the present invention. In some embodiments, video streaming server 324 may receive data representing any or all video signals received at display manager 306, and may convert those signals to a format suitable for streaming through Internet server 322.

It should be noted that the block diagram of FIG. 3 separates components according to their function in system 301, and is not intended to imply that the functions must be performed through separate physical devices. For example, a single processing device may be programmed or otherwise configured to perform the functions of the e-sports system sever 303 and virtual game controller 321. Similarly, the functions of wagering backend server 323 and wager account server 325 may be performed on a single processing device such as a server with sufficient capacity. The invention is not limited to any particular arrangement of processing devices to perform the various functions provided in e-sports gaming system 301.

Figure 4:
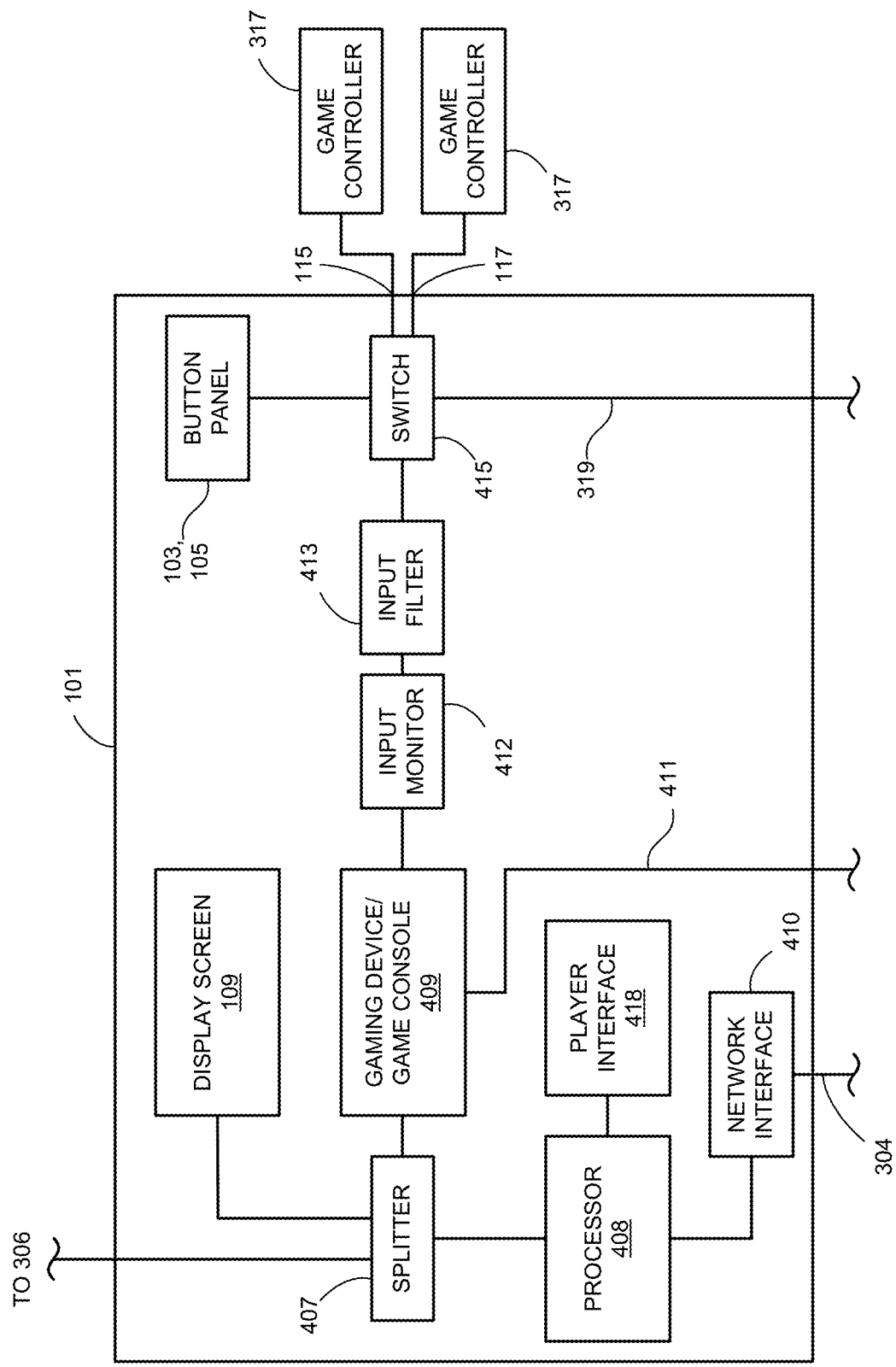
FIG. 4 is a block diagram illustrating a gaming machine which may be employed in an embodiment of the present invention.

Referring now to the block diagram of FIG. 4, gaming machine 101 includes a gaming device (a game console or any other type of gaming device) 409 that is operatively connected to button panels 103 and 105, and to external game controllers 317 through jacks 115 and 117. Gaming device 409 is also operatively connected to provide a video output to a video signal splitter 407 which splits the signal into multiple streams. These multiple streams of the video signal output from gaming device 409 are directed in this illustrated embodiment to display 109 of the gaming machine, and also to a gaming machine processor 408 which serves as an image evaluation processor as will be described below in connection with FIGS. 5-8. The video output signal from gaming device 409 is also directed to display manager 306 (FIG. 3) so that the video may be displayed as desired on displays 305 and also converted to a streaming format for display at remote devices. Gaming device 409 may comprise an XBOX®, PLAYSTATION®, or other gaming console or system (such as a PC) and is operable to present a game for one or more players and to communicate with the applicable gaming system through network connection 411. It is noted that network connection is a separate connection in this embodiment since gaming device 409 will generally have its own onboard network interface device (not shown). Also, network connection 411 may be to network 304 or a separate local area network that provides Internet access to device 409. Local inputs during the play of a game through gaming device 409 may be provided by players through integrated player controls 103 and 105, or through game controllers 317 which may be connected via jacks 115 and 117. Other inputs, particularly inputs for setting up a game in a tournament, may be provided through input path 319 which connected to the virtual controller 321 shown in FIG. 3. All of the input routes are through a switch 415 which may be controlled through virtual controller 321 as will be described below in connection with FIG. 9. The example e-sports gaming machine 101 shown in FIG. 4 further includes an input monitor 412 interposed together with an input filter 413 between gaming device 409 and switch 415. As will be described further below in connection with FIGS. 11 and 12, input monitor 412 is operable to monitor inputs during the course of play in a game to detect prohibited play such as automated play which could provide a player with an unfair advantage in a game. Input filter 413 is included to block certain prohibited inputs in the course of game play such as a "pause" command that might otherwise be available for gaming device 409. Further details of example button filters will be described below in connection with FIGS. 13 and 14.

FIG. 4 also shows that gaming machine 101 includes a player interface 418. Player interface 418 is illustrated here as being connected to processor 408 and functions to allow a player at gaming machine 101 to interact with system 301 separately from game play through gaming device 409. For example, player interface 418 may allow the player to place wagers on their own and other e-sports games. In some embodiments player interface 418 may include a currency acceptor, credit card, or player card reader, and controls such as physical or virtual (touchscreen-implemented) buttons. These elements allow the player to enter or insert value into the gaming system 301 which may be tracked, for example, by wager account server 325 in FIG. 3, and may further allow the player at the gaming machine to select both the type of result for a wager and also the wager amount. Player interface 418 in this example embodiment communicates across network 304 through network interface 410 included in gaming machine 101.

Although the example e-sports tournament gaming machine 101 is shown as having a single display device 109 controlled by gaming device 409, other implementations may have an additional display controlled by suitable processor (such as processor 408 in the example of FIG. 4). This second display may be controlled by the processor and other elements in the system (such as e-sports system server 303) to display real-time leader board information including current relative positions of participants in tournament play within the second display area and may further be configured to display at least one of the player video feeds together with an individual result of play in a tournament game.

There is wide variation possible in e-sports gaming machines within the scope of the present invention. In addition to e-sports tournament components described above in connection with FIG. 4, the e-sports tournament gaming machines such as gaming machine 101 may optionally include conventional gaming components, such as printers and bill acceptors, operable to provide traditional wagering games. The e-sports gaming machines may also be automatically convertible between in-revenue and out-of-revenue operating modes through instructions transmitted by e-sports system server 303 or a separate tournament server. Additionally the e-sports tournament gaming machines 101 may include video cameras connected to provide live video feed to one or more external displays such as displays 330 in FIG. 3, such as during tournament play when live video feed of the players and the player tournament positions may be driven in real-time to the external displays. More detailed descriptions of the in-revenue and out-of-revenue gaming machine configurations and automation together with a tournament server is more fully described in U.S. Pat. No. 9,443,394 filed Jun. 24, 2013, and entitled "Convertible In-Revenue and Out-of-Revenue Gaming System and Method with a Real-Time Streaming Video Feed and Display" which is incorporated by reference.

Figure 5:
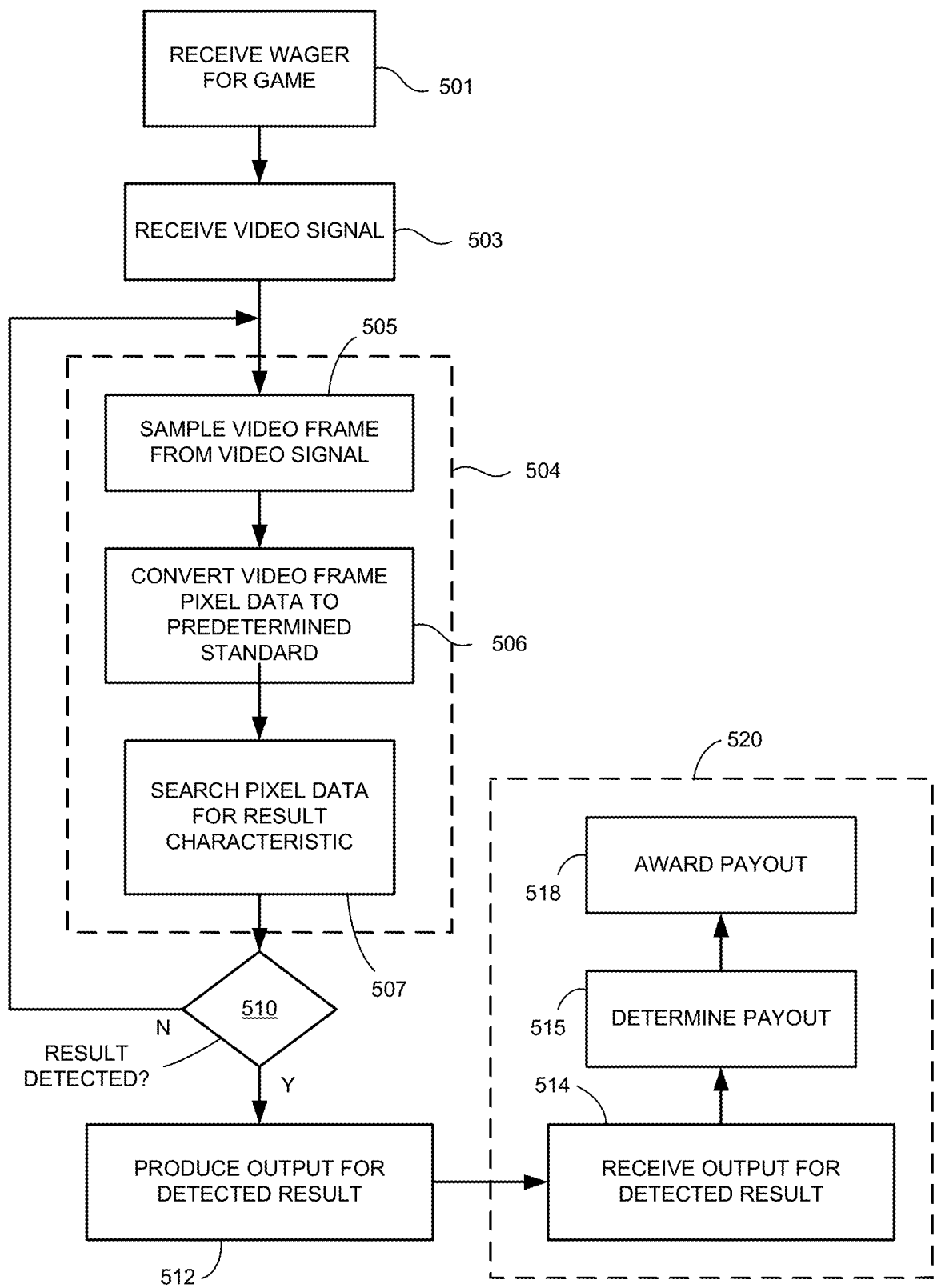
FIG. 5 is a process flow chart showing a method of identifying a result in a game and resolving a wager on that result according to one or more embodiments of the present invention.

FIG. 5 illustrates a method according to one aspect of the invention. In particular the method shown in FIG. 5 illustrates how a video signal from a video game is processed to resolve a wager on a result in the video game. The method includes receiving a wager for a result in the game as shown at process block 501. The method also includes receiving a video signal for the game as shown at process block 503. The process then goes through a series of steps shown within dashed box 504 which represent an image evaluation process which ultimately detects a result in the video game so that the wager received at process block 501 may be resolved. If the result is detected as indicated by an affirmative outcome at decision box 510, the process includes producing an output identifying the detected result as indicated at process block 512 and communicating that output to a process shown in dashed box 520 for resolving the wager placed at 501. This output is received as indicated at process block 514 and the payout, if any, for the wager is identified at process block 515. Any payout awarded as indicated at process block 518.

In the context of the example gaming system 301 shown in FIG. 3, and gaming machine shown in FIG. 4, the steps shown in dashed box 504 plus the step shown at process block 512 are steps that may be performed by the processor 408 in FIG. 4 serving as an image evaluation processing system. The steps shown in dashed box 520 are steps that may be performed by e-sports system server 303 shown in FIG. 3 in cooperation with wagering backend server 323 and wager account server 325.

The wager received at process block 501 may be received from a gaming machine such as gaming machine 101 involved in the e-sports game or may be received from any other wagering device configured to place a wager for the video game e-sport contest. For example, the wager may be placed through a remote wagering device such as a device 327 shown in FIG. 3 or at a kiosk or other wagering device at a remote gaming site 328 in FIG. 3. Also, the wager received for the game at process block 501 in FIG. 5 could be received from an additional gaming machine such as one of the additional gaming machines 326 shown in FIG. 3. Regardless of from where and specifically how the wager is received, the wager has the effect of setting the result to be detected by the evaluation shown in dashed box 504 in FIG. 5. For example, a patron may place a wager that a given contestant, either a character in the game or a player controlling a character in the game, will win a given match in the video game representing an e-sport contest. In that case a state in the game from which the result can be detected is a state in which the video game generates an image showing one of the contestants as the winner for that contest. As another example, a patron may place a wager that a given contestant, again either a game character or a player controlling a given character in the contest, will be the first to lose a "life" in the course of an e-sport match. In this example the state in the game from which the result can be detected is the state in which the video game first generates an image showing that a character has lost a life in the contest. This latter example is an example of a result which is an interim result in the game, while the former example is an example where the result to be detected may a final result in the game. Given the connection between the wager received at process block 501 and the result to be detected (and the video game state which shows the result to be detected) which is the subject of the evaluation process shown in dashed box 504, it will be appreciated that the process steps shown in FIG. 5 are conducted for each wager received for the game and that these processes are conducted in parallel by the data processing systems which perform the various processing steps. That is, for a given e-sport contest each wager which defines a result to be detected generates an instance of the process shown in FIG. 5.

In the context of the example system and e-sports gaming machine shown in FIGS. 3 and 4, the video signal received as shown at process block 503 in FIG. 5 is received by processor 408 from splitter 407 which splits the video output from the gaming device 409. The video signal may be in any form which may be output from the gaming device such as HDMI and VGA for example. Regardless of the specific video format, and as is well known in the art, the video signal comprises a stream of data defining a series of image frames which are displayed sequentially on a display device (such as device 109 in FIGS. 1 and 4) in order to produce the desired video image on the display device. The display device shows the series of frames rapidly at a suitable frame rate to produce a desired smoothness of motion for the video. Each frame in the series of frames making up the video signal received at process block 503 in FIG. 5 is made up of a series of pixels with each pixel defining the light to be produced in the display device a particular point in two dimensions across the display screen.

The evaluation process shown in dashed box 504 includes sampling a video frame from the video signal as indicated at process block 505. The sampling step may include simply storing the data representing a frame from the sequence of video frames in suitable storage of the implementing processing device, processor 408 in the example of FIG. 4. The illustrated method in FIG. 5 also includes converting the video frame data to pixel data according to a predefined standard as shown at process block 506. This conversion may, for example, produce a set of pixel data that represents a two dimensional array of pixels stored in any suitable data format. The evaluation process then includes searching the pixel data of the frame output from process block 506 for a result characteristic corresponding to the result to be detected in the game. This searching process is shown at process block 507 in FIG. 5 and may be performed by any suitable technique, including by comparing the pixel data from process block 506 to a set of stored data (which may be referred to as "result image definition data") which defines an image or portion thereof expected to be displayed for the result to be detected. Such a comparison performed at process block 507 is conducted to determine if there is a match between the pixel data produced according to process block 506 and the stored result image definition data for the result to be detected (the result set by the wager received at process block 501). For example, assume that the wager received for the game at process block 501 is a wager that player A will ultimately win a given video game contest against player B. This wager sets the wager result to be detected as the state of the video game in which one of the players or their avatar/game character is shown as the winner of the contest. In this case the stored data for a comparison to the pixel data from process block 506 (where a data comparison technique is used) is data which defines the display in the game showing the overall result and indicating that one of the players (or their avatar/game character) has won the contest. If the comparison conducted at process block 507 in this case indicates a match in pixel data, it can then be determined from the matching which player has won and thus the result is detected. If the result is not detected as indicated by a negative outcome at decision box 510, the process returns back to sample and process/evaluate another video frame from the video signal. However, if the result is detected by the search indicated at process block 507, the process proceeds to process block 512 to produce an output identifying the detected result.

The output produced at process block 512 may comprise any suitable output that will facilitate the process steps shown in dashed block box 520, namely, determining the payout for the wager, if any, and awarding that payout. Going back to the example in which the wager was that player A will win in the game against player B, the output produced at process block 512 would be any output that identifies whether or not player A has won the game. If player A has lost the instance of the video game, the payout determination at process block 515 may be that no payout should be made and thus no award would be paid at process block 518. However, if the output at process block 512 indicates that player A has won, the process at block 515 determines the payout based on the applicable odds which may for example be determined by a suitable odds setting arrangement such as wagering backend server 323 in FIG. 3. In any event the payout determined at process block 515 is awarded in some suitable fashion as indicated at process block 518. This awarding step in the case of system 301 shown in FIG. 3 may include an instruction from e-sport system server 303 to wager account server 325 to increment the patron's account by the determined payout amount, (which may be in the form of credits redeemable for value, cash, player club points, or in any other form).

Figure 6:
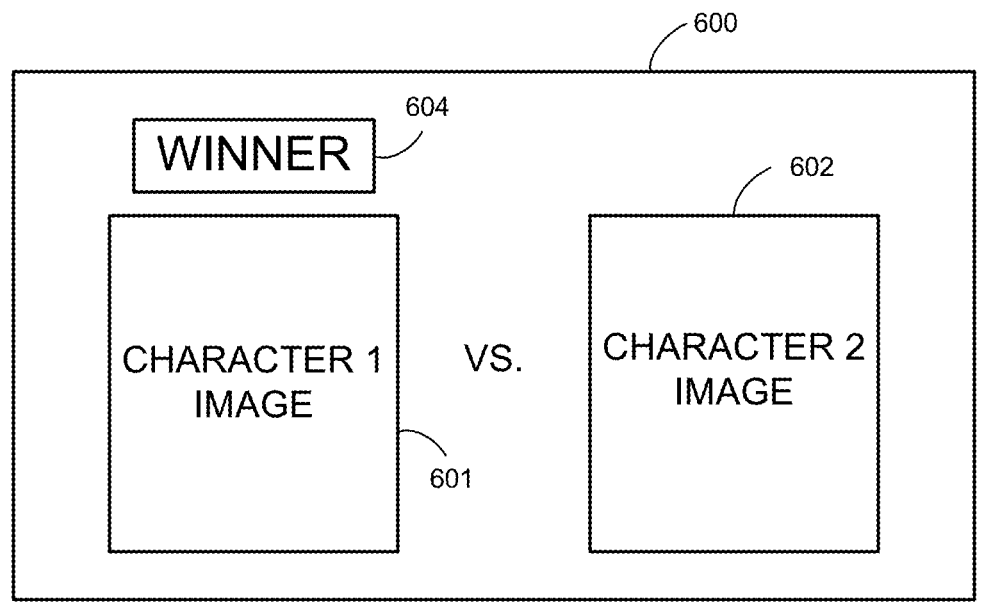
FIG. 6 is a schematic representation of a game image from which a game result may be identified according to various aspects of the present invention.
Figure 7:
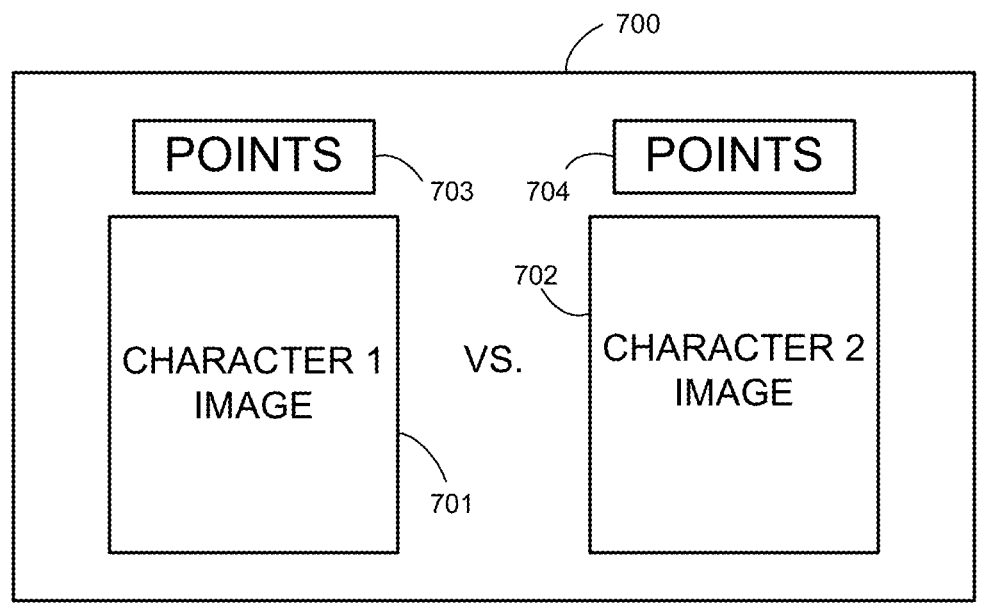
FIG. 7 is a schematic representation of an alternative game image from which a game result may be identified.
Figure 8:
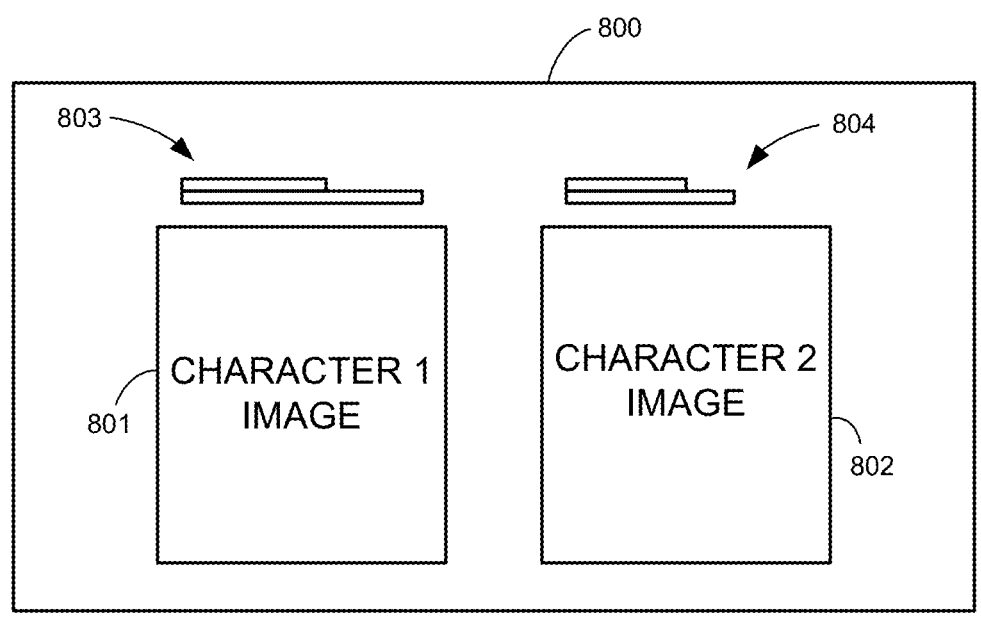
FIG. 8 is a schematic representation of another game image from which a result in a game may be identified, where the result is an interim result in the game.

The schematic representations of video game images (that is, screenshots) of FIGS. 6-8 may be used to describe examples of instances of the process shown in FIG. 5 and certain elements of the process which may be employed in various embodiments of the invention. Referring first to the example screen display 600 of FIG. 6, the display represents a display that may be produced in the video game at the conclusion of a contest between a character 1 and character 2. In this example the display includes an area 601 which will contain an image of character 1 and also an area 602 which will contain an image of character 2. Another area 604 on the display includes a banner or descriptive text such as the term "WINNER" in a position in relation to the character that has won the match, in this case character 1. Referring back to the example in the previous paragraphs discussing FIG. 5, character 1 may be a character controlled by player A whereas character 2 may be a character controlled by player B. In this example, the search of pixel data performed at process block 507 in FIG. 5 will be a search for a screen display containing the result characteristic indicating parts of the display shown in FIG. 6 or a screen display containing the opposite result characteristic indicator in which the WINNER banner is not in area 604 but is in an area located above character 2 in area 602. Where the search for the result characteristic is performed by comparing the pixel data generated for the given image frame with stored result image definition data, the comparison for FIG. 6 would result in a match of pixel data defining the term "WINNER" in the display and/or other result indicating characteristics of the display. It should be noted here that if the video screen display had produce pixel data showing the term "WINNER" positioned over the image of character to that is player B's character, this would also indicate the result in the contest and would produce a positive outcome at decision box 510 in FIG. 5. However, in this latter case the output produced according to the process at block 512 in FIG. 5 would indicate that player A had lost the contest.

The search for a result characteristic (as at 507 in FIG. 5) comprising a textual label as in the example of FIG. 6, provides a convenient example for describing a manner in which the present invention may detect a result in the video game on which a wager is placed. However, embodiments of the present invention are certainly not limited to searching for textual or alphanumeric labels in the image frame being evaluated. Numerous other result characteristics might be used in a given embodiment depending somewhat upon the nature of the image frame being evaluated. For example, a video game which may be used in a gaming system such as system 301 in FIG. 3 might be configured so that the result of a contest is always displayed in a box defined in the display as a rectangle or some other geometric pattern, and the position of that box in the display may indicate which contestant won the contest. In this case, the search, whether by comparison of stored result image indicating data or otherwise, might be for the geometric pattern in the display and not for an alphanumeric characters. Other example result characteristics which might be the subject of the search at block 507 of FIG. 5 might be a certain color in a certain area of the image frame. Also the search at block 507 in FIG. 5 might be for two or more result characteristics to provide higher confidence in accurately detecting the result.

In order to reduce the amount of processing that must be performed in the search at process block 507 in FIG. 5, and depending upon the video game generating the image frames under evaluation, some implementations of the present invention may initially search the pixel data of a given frame for some threshold characteristic distinct from the result itself that will only be present in a frame showing the result to be detected. For example, the image represented in FIG. 6 includes the characters "VS." in the display showing the result of the contest. Where such a threshold characteristic exists, an embodiment of the present invention may include a separate threshold search that is performed to detect the threshold characteristic prior to or as part of the search indicated at process block 507 in FIG. 5. If the threshold characteristic is detected the search may continue for the result to be detected. However, if the threshold characteristic is not detected, the process may loop back to begin processing the next video frame sampled according to process block 505 in FIG. 5.

Referring now to the example of FIG. 7, the image from which the video frame pixel data is produced does not rely on a textual label such as the term "WINNER" as in FIG. 6, but rather point totals for the match. In this case the display 700 would include an area 701 showing character 1 and an area 702 showing an image of character 2. A point total for the match is included at a given position proximate to each character image, area 703 above area 701 and area 704 above area 702. In this example, the search to be conducted at 507 in FIG. 5 might be a search for point totals, that is, numeric values, in the areas 703 and 704. The search conducted at 507 in FIG. 5, whether by a pixel data comparison technique or otherwise, would in this case not only search for the numeric values in the expected areas, but would also include the step of evaluating the point totals detected to determine which player/character had the higher point total and thus won the contest. Of course, a threshold characteristic search may be performed in connection with the example display of FIG. 7, such as for the textual label "VS." as described above in connection with FIG. 6.

FIG. 8 shows yet another example of a video game image from which a result in the video game may be detected. In this particular example the image 800 may be one displayed during the course of a game and before an overall result for the game may be determined. Thus the result to be detected from the image may be an interim result. The image 800 includes an area 801 containing an image of character 1 and an area 802 containing an image of character 2 at a given point in time in the game. In the example of a combat game, the image may show a point in time in which the two characters are in the midst of combat. In this example, the game includes status bars, in this case two separate bars, in an area proximate to the given character. Status bars 803 are associated with character 1 and status bars 804 are associated with character 2. Each set of status bars 803 and 804 may, for example, include a health bar and a strength or power bar. The result to be detected in image 800 may, for example, be a result that is indicated by the set of status bars. For example, a wager received at 501 in FIG. 5 may be a wager that player A (who controls character 1 in the game from which image 800 is taken) will lose a life first in the contest before player B (who controls character 2). The game may be configured such that every time a character loses a life a health bar associated with that character reduces to zero so as to disappear from the screen until the character re-spawns. Thus the result to resolve a wager regarding the first player to lose a life in the contest can be detected from an image in the game in which the health bar for one of the characters first reduces to zero. In this example scenario, the search conducted at 507 in FIG. 5 could be for a representation of a player health bar at a zero level and then for which character the zero health bar is associated. From this information an output identifying the detected result may be produced according to block 512 in FIG. 5.

In each of the examples described above in connection with FIGS. 6-8, the wager is resolved by a result in a contest between two characters. Of course in other games there may be three or more characters which may each be controlled by a different player. It is also possible that characters controlled by different players may represent a team and a wager may be placed on a result associated with team play. In each case, the search process performed at block 507 in FIG. 5 would search for some characteristic in the given image under evaluation which indicates a result from which the wager placed for the game may be resolved.

It should be noted that wagers may be placed in the process of FIG. 5 on results which are transient in the game, and thus appear in an image from the video stream for only a limited number of images. This is particularly the case for interim results such as the above example of the first character to lose a life in the game. The limited number of image frames showing a result affects the sampling rate from the incoming video stream in the sense that the sampling rate must be high enough to ensure detection of a transient result from which the given wager may be resolved.

The above examples described in connection with the process shown in FIG. 5 each refer to a result associated with an individual instance of a video game conducted through a gaming machine 101 in FIGS. 1, 3, and 4. The present invention is not, however, limited to individual game results. For example, a patron may place a wager that a given player will win a given tournament among many players. Such a wager can only be resolved after a number of instances of the video game until ultimately a winner of the tournament is declared in accordance with the tournament rules. In this case, the process steps shown in dashed box 504 in FIG. 5 may be performed for each instance of a game in the tournament and the result of that instance reported to e-sport system server for processing in accordance with dashed box 520. However, the processing here may include maintaining the individual game results so that the ultimate tournament winner can be identified. Thus the process at block 514 may include maintaining and tabulating the result information, and the process would proceed to determine the payout at process block 515 only once the tournament winner has been identified from the result outputs for the various individual matches in the tournament.

In order to facilitate setting up tournaments between e-sports players and facilitate player progression through the given tournament, e-sports gaming system 301 shown in FIG. 3 includes an arrangement that allows the match set up in the underlying e-sports game to be overridden by the e-sports gaming system. Typically in an e-sports game conducted through a platform such as XBOX ONE®, a player logs into an XBOX ONE® console, selects a game to play, and then navigates through a setup process for the game to select various options and to select an opponent or have the system select an opponent (which may be another player or an AI). The setup overriding arrangement according to some embodiments of the present invention blocks local controller inputs that an e-sports player might otherwise make, and in the place of the local controller inputs makes virtual controller inputs to select an opponent and otherwise control the game setup process.

Figure 9:
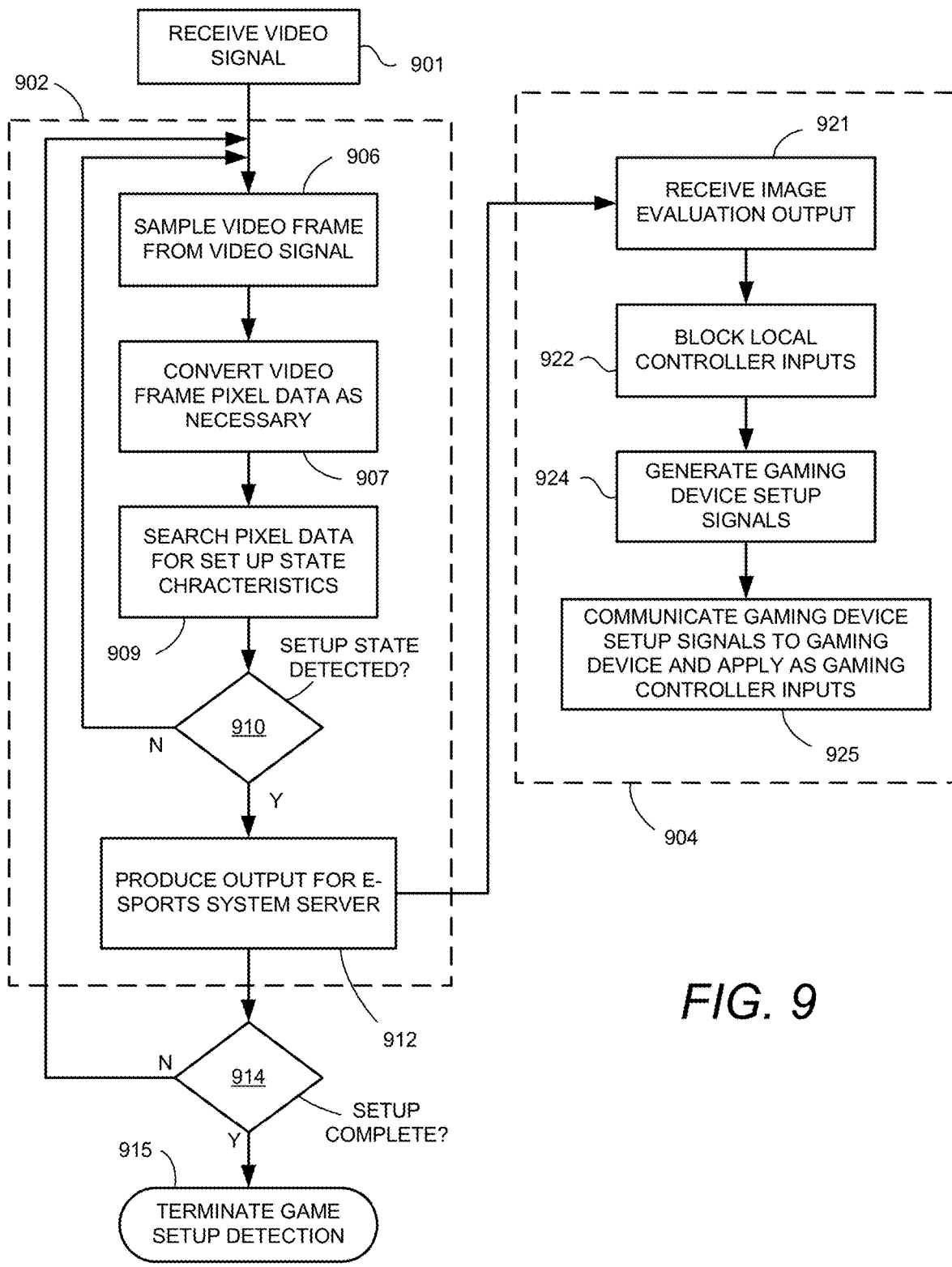
FIG. 9 is a process flow chart showing a method of setting up tournament play in a game according to one or more embodiments of the present invention.

FIG. 9 shows process for controlling e-sports game setup according to an implementation of the present invention. The process of FIG. 9 includes first receiving a video signal from the e-sports gaming device as shown at process block

901. This video signal may be a signal split from the gaming device by splitter 407 shown in FIG. 4. The process then includes a number of steps shown in dashed box 902 which detect a game setup state in the game and produce a suitable output when the state is detected. FIG. 9 also shows a number of steps in dashed box 904 which respond to the output indicating the setup state is detected. This response is to generate inputs and communicate those inputs to the gaming device to set up play for a given player.

The example process shown in dashed box 902 is similar to the result detection process shown in FIG. 5 in that it relies on sampling video frames from the game device to detect a particular image state. In the process of FIG. 5 that state conveys a result in the game, while in the process of FIG. 9 the state detected is a setup state apparent from an image frame of the received video signal. The process includes sampling a video frame from the video signal as shown at process block 906 and then converting the video frame pixel data as necessary as shown at process block 907. These processes at 906 and 907 of FIG. 9 correspond to the processes at block 505 and 506 in FIG. 5 and all of the variations and characteristics of those processes apply equally to the processes at 906 and 907. The process further includes searching the pixel data to for a setup state as shown at process block 909. In the event the setup state is detected from the operation at process block 909, the process includes branching from decision box 910 to produce an output for the tournament server as shown at process block 912. If the setup state is not detected, as indicated by a negative outcome at decision box 910, the process loops back to sample another frame at process block 906. Once the output has been produced for the processes in dashed box 904 according to this example, the process determines whether set up is complete (that is, will be complete after the processes at dashed box 904 are completed). This may be discerned from the setup state detected by the search indicated at process block 909. If set up is complete as indicated by an affirmative outcome at decision box 914, the process simply terminates as indicated at 915. However, if set up is not complete, the process loops back to sample another image from the video signal to initiate the process for detecting the next setup state in the game setup process.

The search techniques described above in connection with process block 507 of FIG. 5 apply equally to the search performed at block 909 in FIG. 9. However, in the case of process block 909, the search is for pixel data that would be expected at a given setup state of the game. Where the search is conducted by comparing the pixel data from the sampled frame, to stored data, the stored data would be data defining pixels of an image or portion of an image included in the image frame for the setup state to be detected. An example of such a state will be described below in connection with FIG. 10.

In response to the output produced as shown at process block 912 and received at process block 921, the example process shown in FIG. 9 includes blocking local controller inputs for a given e-sports gaming machine as shown at process block 922. This may be accomplished by controlling the switch 415 in the example e-sports gaming machine of FIG. 4 to prevent inputs from button panels 103, 105 and any game controllers 317 which may be connected. The process of FIG. 9 next includes generating gaming device setup control signals as shown at process block 924 and then communicating these gaming device setup control signals to the gaming device as shown at process block 925.

The process shown in FIG. 9 may be initiated in a number of different ways within the scope of the present invention. In some implementations an e-sports player may enroll in a tournament at a tournament enrollment device such as device 310 in FIG. 3. A player may also enroll in an e-sports tournament through an interface such as interface 418 included at e-sports gaming machine 101 in FIG. 4, or an additional gaming machine 326 locally in system 301, or through a gaming machine, enrollment station/kiosk, or e-sports gaming machine at a remote gaming site such as 328 in FIG. 3. After enrollment, the player may be directed to one of the e-sports gaming machines (101 in FIGS. 3 and 4) at a specific time. The player may then login to the gaming device 409 at that e-sports gaming machine. The setup state detection process shown in dashed box 902 in FIG. 9 may be initiated at the scheduled time for the player or perhaps somewhat before that time to ensure that the desired setup state is detected. In this example the setup state may be the state of the gaming device 409 and image output from the gaming device at the point in time at which the player is logged in to the video gaming system supported by the gaming device.

In the context of the example gaming system 301 shown in FIG. 3 and the example e-sports gaming machine 101 shown in FIG. 4, the image evaluation process shown at dashed box 902 in FIG. 9 may be performed by processor 408 operating as an image evaluation processor. In such an implementation, the output produced at block 912 in FIG. 9 may be a network communication initiated by processor 408. The process shown at dashed box 904 in FIG. 9 may be performed by e-sport system server 303 in concert with e-sports system game controller 321 in FIG. 3, together servicing as a tournament processing device. In particular, e-sport system server 303 may receive the output produced according to process block 912 in FIG. 9 as a communication over network 304 in FIG. 3. The e-sport system server 303 may then direct the e-sport system game controller 321 to send a command through path 319 to block local controller inputs (in accordance with block 922 in FIG. 9), and generate the appropriate gaming device setup control signals (in accordance with block 924 in FIG. 9). These gaming device setup control signals are communicated to the e-sports gaming machine and applied as gaming controller inputs (in accordance with block 925 in FIG. 9) by e-sports system game controller 321.

Figure 10:
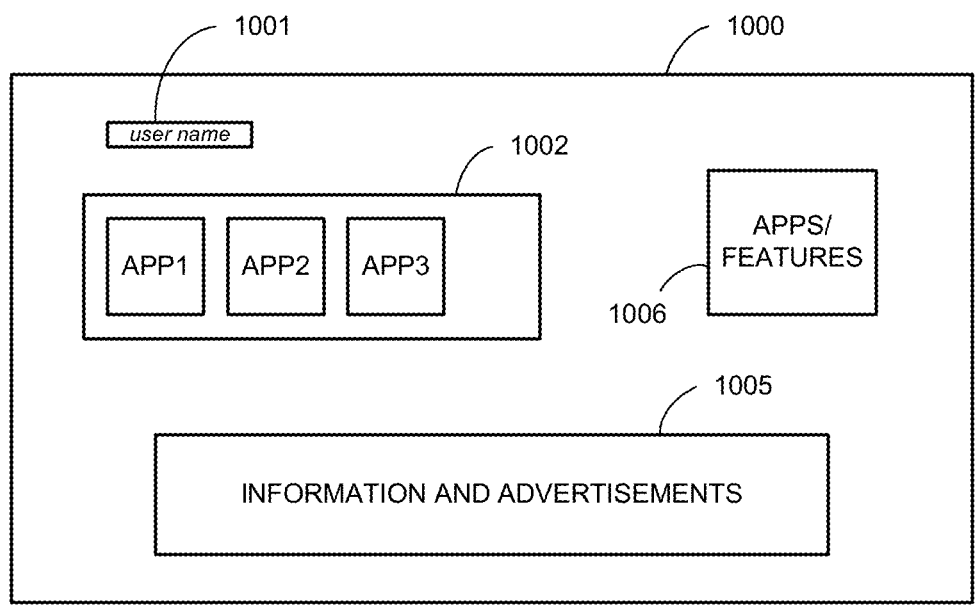
FIG. 10 is a schematic representation of a game image from which a setup state for a game may be identified.

The display image representation of FIG. 10 may be used to describe a set up display which may be detected according to the process in block dashed box 902 of FIG. 9. This display image 1000 in the example of FIG. 10 may, for example, be the display produced at gaming device 409 in FIG. 4 in response to a player logging on to the platform. Display image 1000 includes an area 1001 in which a username is displayed for the user that has logged on, along with an area 1002 for various applications (games) which are available on the gaming device 409. Image 1000 may include other information and advertisements as shown in field 1005 and other information in a field 1006. The state of the gaming device 409 indicated by image 1000 is a state in which the user/player may select a game, and then go through a sequence in which the player sets up play in the game by perhaps selecting an opponent and perhaps selecting other characteristics of game play. However, according to aspects of the present invention, this initial setup state is a state in which the e-sport system server 303 and virtual controller 321 may take over the setup process so that the respective e-sport gaming machine may be used to play a scheduled tournament e-sport game.

In implementations of the invention where the search conducted at block 909 in the process of FIG. 9 is performed by conducting a comparison of the pixel data from the sampled image and stored image data, the stored image data may include pixel definitions for any suitable characteristics of the example image shown in FIG. 10. A suitable characteristic or set of characteristics would be those that are unique to the setup state indicated by the image in FIG. 10. Where any of the areas 1001, 1002, 1005, and 1006 include a border, the stored image data might include pixel data that would be expected to define the given border. As another example, where the location of the user name in the image is unique to the setup state, the search conducted at 909 in FIG. 9 may be a search for alphanumeric characters in the area 1001 in the pixel data defined by example image 1000. Such a search may be conducted by comparison to stored data or by any suitable algorithm.

Prior to the start of a tournament round, respective display screens 109 may prompt each player to respond and each player may be required to input (at the respective gaming machine 101) information requested on the display screen 109. For example, players may be prompted in this fashion to log in to the gaming device 409 of the gaming machine 101 (FIG. 3) and to otherwise enter identifying information. The prompt may be displayed as an overlay on display screen 109 of each gaming machine, or could be displayed at some other display device of the gaming machine such as player interface 418. Alternatively, the prompt may be displayed through a group display device such as display 305 in the example system shown in FIG. 3. In some instances, game play may comprise play of a live player with a virtual player, such that virtual controller 321 may be automated to play according to a selected player level, versus a live player entering inputs at the respective player gaming device. As game play proceeds, the live play displayed on respective display screens 109 may be shown substantially in real-time or replayed on various external displays 305 according to tournament software executed by the e-sports system server 303. When the selected games are completed, either in accordance with a timer or game rules, the winning player or team is determined by the e-sports system server 303 which causes the game results to be displayed on one or more display screens in the system 301.

Figure 11:
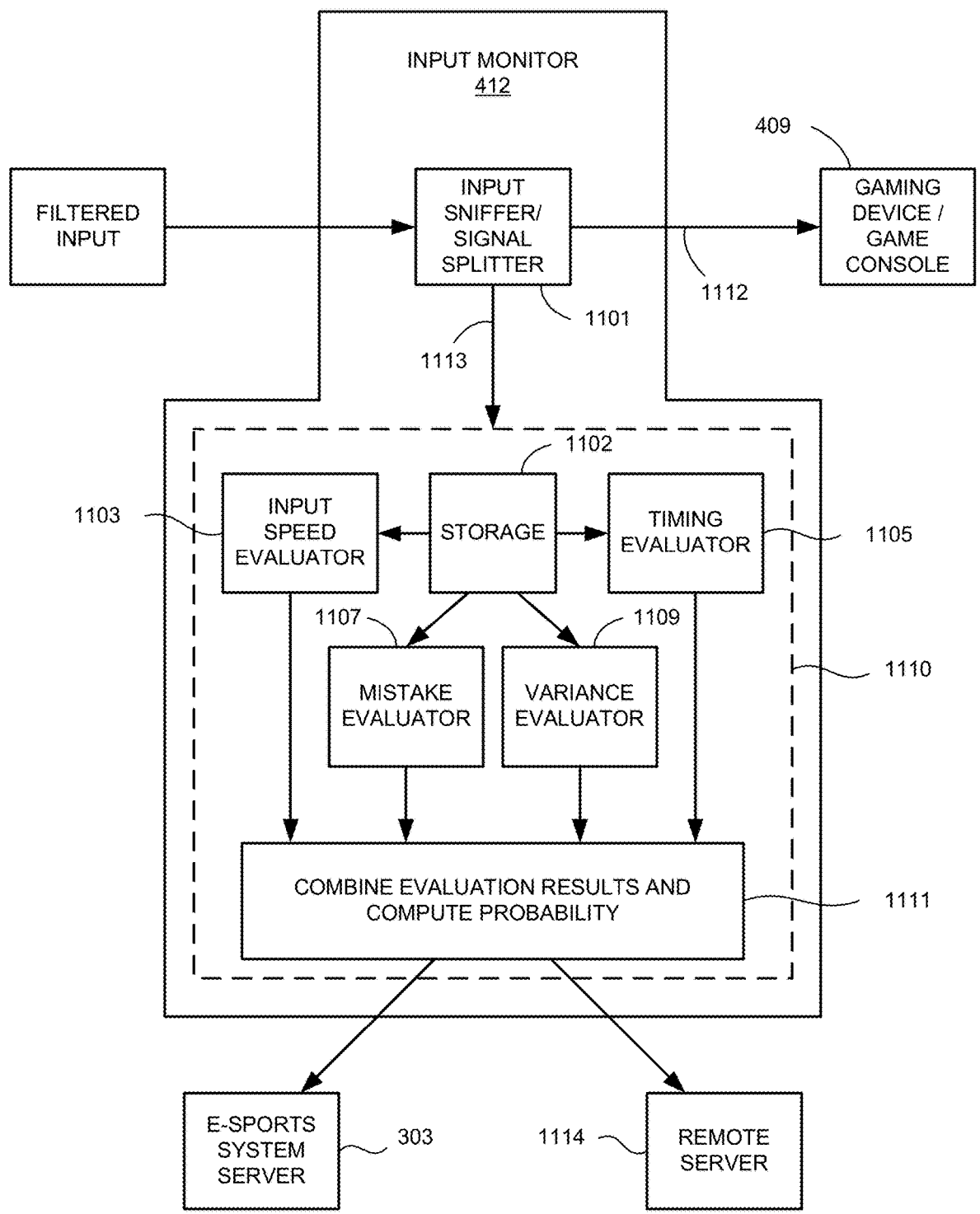
FIG. 11 is a block diagram of an example input monitor in accordance with one or more embodiments.
Figure 12:
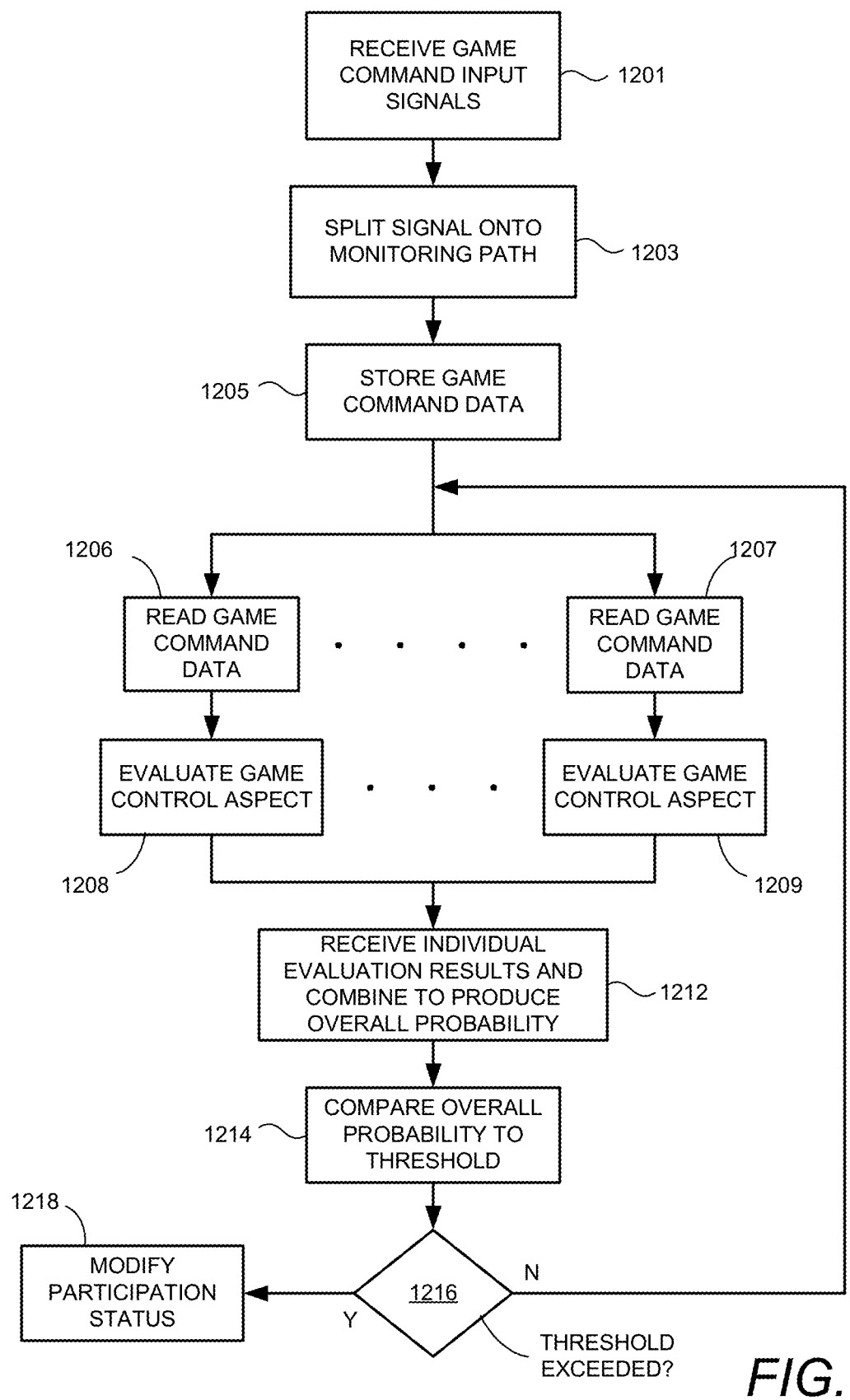
FIG. 12 is a process flow chart showing a method of monitoring game command input signals according to an aspect of the present invention.

FIGS. 11 and 12 may be used to describe further aspects of the input monitoring device (input monitor) 412 shown in the example e-sports gaming machine 101 of FIG. 4. As shown in FIG. 11, the example input monitoring device 412 includes an input sniffer/signal splitter component 1101, a data storage unit 1102, an input speed evaluator unit 1103, an input timing evaluator unit 1105, an input mistake evaluator unit 1107, a variance evaluator unit 1109, and an overall probability determining unit 1111. Input sniffer/signal slitter 1101 is operable to split off the game command input signals from an input path 1112 from a game controller (317 in FIG. 4) to the gaming system (109 in FIG. 4) and direct the signals along a monitoring path 1113 to processor 1110 which implements the various evaluation units in this example. Input sniffer/signal splitter 1101 also allows these game command input signals (from a given player's game controller) to pass through to the gaming device 409 so as not to interrupt the play of the game in progress through the gaming system. Processor 1110 receives the signals from monitoring path 1112 and interprets the signals to produce representative data (game command data) which the processor stores at a suitable storage device such as data storage unit 1102. Once the game command data has been stored, one or more processes are performed by each evaluation unit 1103, 1105, 1107, and 1109 to read the data from storage 1102 and perform analysis to determine a probability based on the respective game control aspect that the game controller input was automated. Each evaluation unit 1103, 1105, 1107, and 1109 reports its results to probability determining unit 1111 which computes an overall probability of automation associated with the game controller input or a number of such inputs.

Each evaluator unit 1103, 1105, 1107, and 1109, as well as the overall probability determining unit 1111 may be a program module of an input monitoring device master program executed by the processor shown at dashed box 1110 within input monitoring device 412. Alternatively, evaluator units 1103, 1105, 1107, and 1109 and unit 1111 may comprise separate general purpose processors or separate application specific processors or circuitry dedicated to perform the specific function of the unit.

In the example arrangement shown in FIG. 11, the final result is communicated to the e-sports system server 303 and/or some other server 1114, either of which may direct further action based on the final result. In particular, the further action may be to disqualify the player associated with the game control input for a current game and/or ban the player for future e-sports games conducted through gaming system 301 in FIG. 3. In some implementations the further action may be automated, or may be made by a system operator after evaluating the output from unit 1111, which may be sent to a suitable display device associated with e-sports system server 303 or server 1114.

The flowchart of FIG. 12 illustrates an example process performed by input monitor 412 according to an aspect of the present invention. The process includes receiving game command input signals as indicated at process block 1201. These are the game command signals that are directed from the player's controller to an input port of the gaming device in the course of the game. The process further includes splitting the signals onto a monitoring path as indicated at process block 1203 while allowing the signals to also continue on to the gaming device input port. As shown at process block 1205, signals received on the monitoring path are interpreted as necessary to produce command data representative of the game commands from the player's game controller and stored in suitable data storage. Periodically or in response to certain events in the course of the game or after completion of a game, the process includes reading the game command data from storage and evaluating a game control aspect of the data. This reading and evaluation is performed for two or more game control aspects as indicated in FIG. 12 by process blocks 1206, 1207, 1208, and 1209 and may be conducted in parallel as indicated in the figure. Game control aspects which may be evaluated to provide an indication of improperly automated inputs include input speed, rate of mistakes, variance between inputs, and timing of inputs. Each evaluation indicated at process box 1208 and 1209 in FIG. 12 produces a probability that the input or stream of inputs (or any subset of inputs) under investigation were improperly automated. The process then includes receiving the individual evaluation results as indicated at process block 1212 and combining those results to produce and overall probability that the game control input or series of inputs were automated. In some implementations of the invention the process includes comparing this overall probability to a threshold probability as shown at process block 1214. If threshold is not exceeded as indicated by a negative outcome at decision box 1216 method includes simply looping back to perform the evaluation for another input or series of inputs. However, if the threshold value is exceeded, the illustrated process includes modifying the participation status of the player who has made the inputs as indicated at process block 1218.

The process steps shown in FIG. 12 from process block 1205 to 1212 may all be performed by a single processing device such as device 1110 shown in FIG. 11 or by multiple processing devices included in the monitoring unit if the unit is implemented with multiple processing devices for the storage and evaluation tasks. The steps of taking action on the overall probability such as comparing the overall probability to a threshold and modifying a player's participation status as shown at process block 1218 may be performed at the monitoring unit such as 412, or may be performed at a separate device in the e-sports gaming system (301 in FIG. 3) to which the overall probability is communicated. Modifying the participation status of the player shown at process block 1218 may be performed either manually by a system operator in response to a notice from the system that an automation probability threshold has been exceeded. Alternatively the incidents of a threshold being exceeded may be reported to a suitable processing device in the system (such as e-sports system server 303 in FIG. 3) which automatically modifies the participation status of the player associated with the input signals which were evaluated according to the process shown in FIG. 12.

Although input speed, rate of input mistakes, variance between inputs, and input timing have been provided as examples of game control aspects which may be evaluated in accordance with aspects of the present invention, the invention is by no means limited to these game control aspects. Any game control aspect which may indicate improper automation may be employed in various implementations. Also, although FIG. 12 suggests that the various game control aspects are evaluated simultaneously, the invention is not limited to such implementations. For example, a probability for one or more game control aspects may be produced for one or more inputs or series of game control inputs to the gaming device, while a probability for one or more different game control aspects may be produced for other inputs or other series of inputs, and these probabilities may be combined as indicated at block 1212 to provide an overall probability over a given period of time.

Input monitoring according to the present invention is not limited to any particular technique for receiving game command input signals, that is, game control signals ostensibly from a player's game controller to the gaming device, or to any particular technique for splitting the game command input signals onto the monitoring path. The techniques for splitting the game command input signals include simply applying the signals to a separate path (the monitoring path) where they may be processed as described above in connection with FIG. 12. Other techniques include receiving the game command input signals at a suitable processing device so that data representations of the signals may be buffered and then transmitting signals replicated from the buffered data on to the gaming device. The buffered data representations of the received game command input signals in this technique may be read from the buffer for storage according to process block 1205 in FIG. 12 and then processed further in accordance with the method shown in that figure. In this latter technique, reading from the buffer represents splitting the incoming game command input signals onto the monitoring path.

Figure 13:
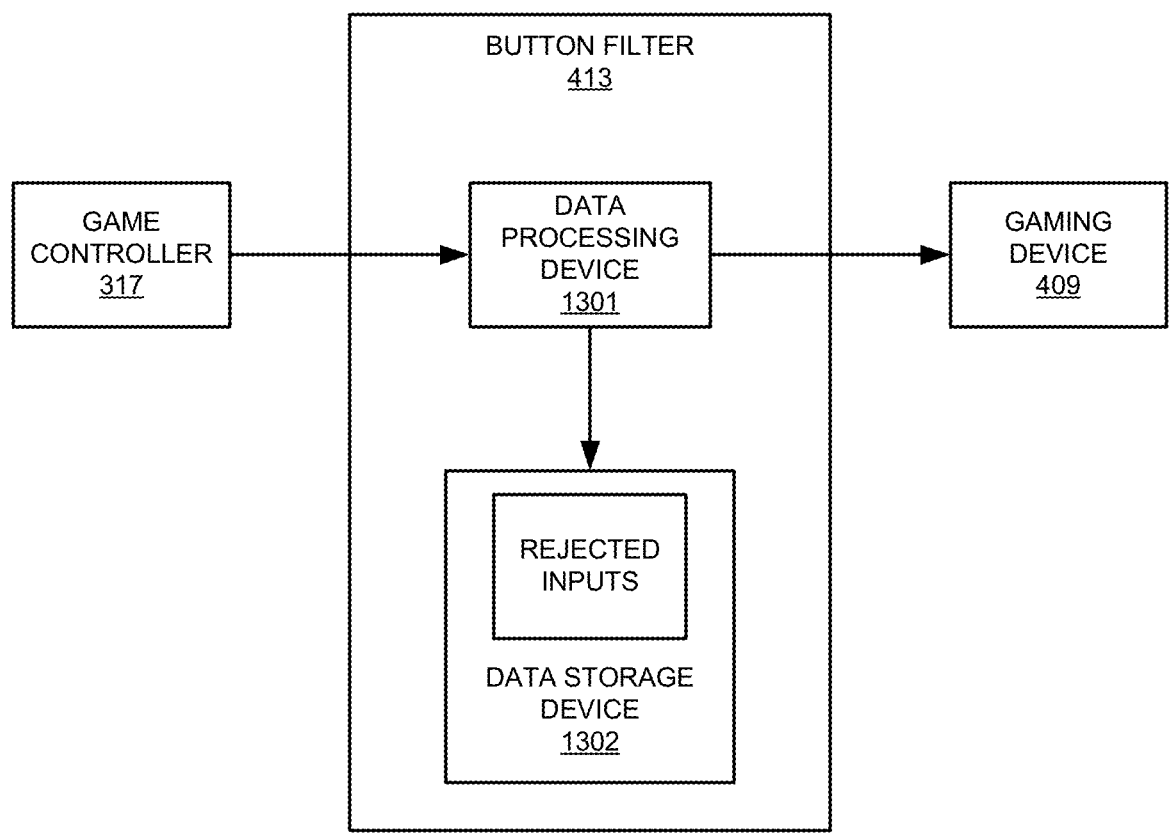
FIG. 13 is a block diagram illustrating a button filter in accordance with one or more embodiments.

Referring to FIG. 13, an example button filter 413 is shown connected to receive the input from a player controller 317 (as described above in connection with FIG. 4) before the gaming device 409 (also described above in connection with FIG. 4). Button filter 413 is configured to filter the signals resulting from certain button presses so that the signals do not reach gaming device 409. In particular, button filter 413 receives inputs in the form of game command input signals from player controller 317, determines if any of the input signals represent prohibited commands at that point in the game, and then either stores the commands deemed prohibited or transmits commands which are not deemed prohibited on to the gaming device 409. The illustrated button filter 413 in FIG. 13 includes a data processing device 1301 connected to receive game command input signals sent from the game controller 317. Data processing device 1301 is also operatively connected to transmit non-prohibited input commands (that is, signals representing those commands) to a suitable input port of gaming device 409. Suitable memory is preferably included with data processing device 1301 to facilitate the prohibited/non-prohibited determination as will be described below in connection with FIG. 14. Additional data storage 1302 is provided in this example arrangement in FIG. 13 to provide a storage location for rejected inputs and information on those rejected inputs such as a timestamp indicating the date and time the input was filtered, and perhaps other information. It will be appreciated that button filter 413 is configured so that the determination as to whether a given input is prohibited is executed very quickly, perhaps in a few microseconds, as to not impact game play.

One use case for button filter 413 is in a gaming tournament, where "pause" and "home" buttons are preferably not allowed to be pressed during a match. In this example, button filter 413 functions to filter out all "pause" and "home" button presses so that a player may not interrupt the game in progress.

Figure 14:
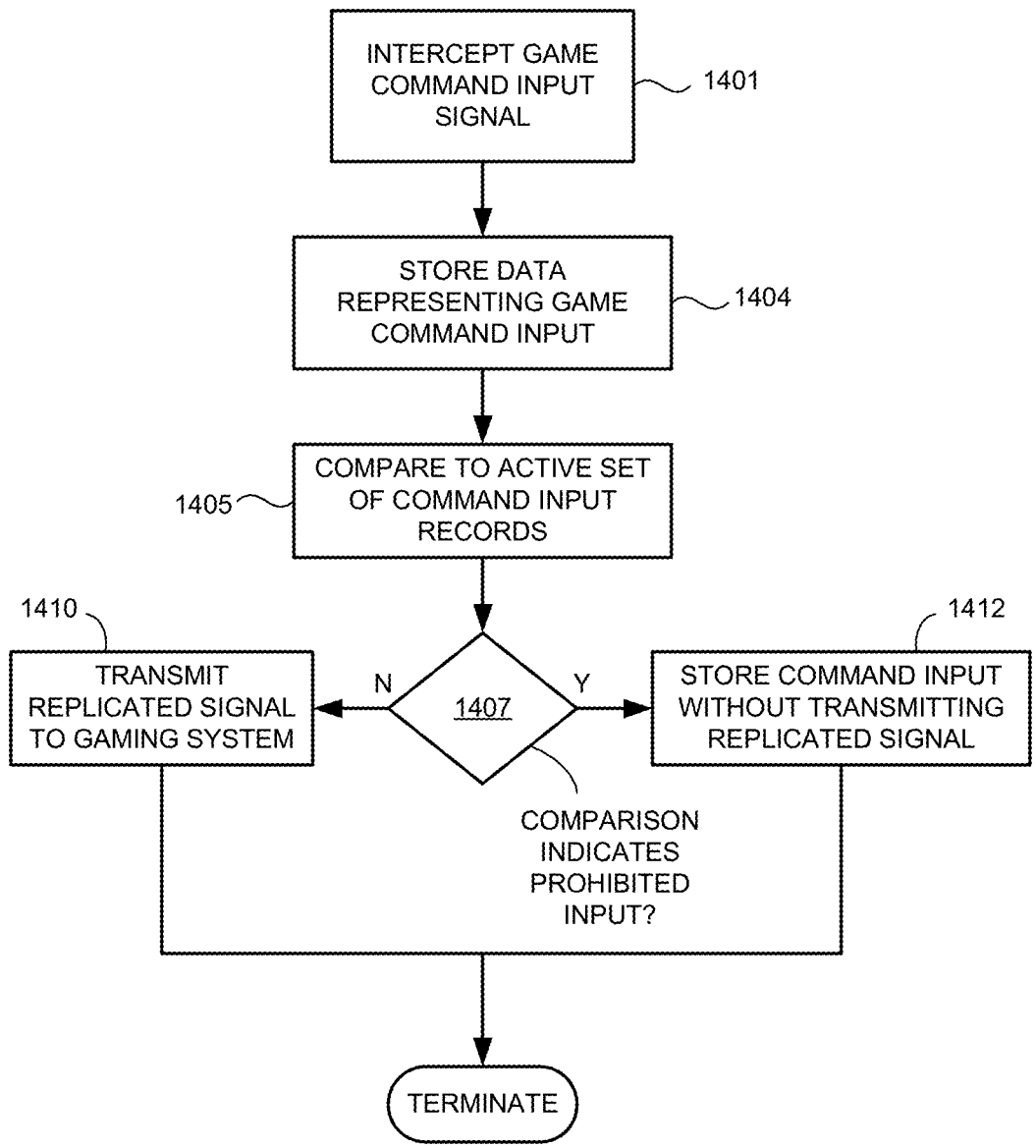
FIG. 14 is a process flow chart showing a method of filtering game command inputs according to an aspect of the present invention.

FIG. 14 shows an example process which may be performed by input filter 413. The process includes receiving the game command input signal is indicated by process block 1401 and storing data representing the game command input as shown at process block 1404. The process then compares the stored data representing the game input command to an active set of command input records as shown at process block 1405. If this comparison indicates that the command input is a prohibited input at the point in time at which the input is received, as indicated by an affirmative outcome at decision box 1407, the process stores the command input in a fashion to maintain a record of the input and does not transmit a corresponding signal on to the gaming device. This action is shown at process block 1412 in FIG. 14. However, if the comparison indicates that the command input is not a prohibited input, process proceeds to transmit a replica of the received signal to the gaming system as shown at process block 1410. Regardless of the result from decision box 1407, the process terminates as to that received game command input signal once the action is taken at blocks 1410 or 1412.

It will be appreciated that the process shown in FIG. 14 is preferably performed for each command entered by a player in the course of a game on the gaming system. However, each comparison may not be to the same set of command input records. Because certain game command inputs may be prohibited at certain stages of the game and not at others, the invention encompasses storing different sets of command input records for comparison as shown at process block 1405. The process may include monitoring the state of the game and activating a set of command input records corresponding to a given game state in response to the detection of that state of the game. Thus button filter device 413 is capable of holding multiple configurations in storage associated with the device, each with a unique to a list of unacceptable inputs to be filtered. Once a configuration is chosen, its list is then considered active and the device will reject all inputs matching the configuration. In any case, any suitable logic may be applied in the comparison indicated at 1405 in FIG. 14 to determine whether the input in question is prohibited. Thus, the set of command input records may list prohibited inputs or allowed inputs. In the former a match indicates the input is prohibited, while in the latter a match in the comparison indicates the input in question is not prohibited.

Because the signal received as indicated at process block 1401 will be a signal encoded for transmission according to a transmission standard acceptable to the gaming device, the signal may be decoded to a suitable representation of the corresponding game command in order to facilitate buffering and processing. This decoding may be performed by data processing device 1301 in the example arrangement of FIG. 13. Similarly, when a replica signal is to be transmitted as indicated at process block 1410, processing device 1301 may perform the encoding necessary to transmit the replicated signal. Alternative arrangements may place the decoding and encoding functions in a processing device separate from the device that performs the comparison indicated at 1405 in FIG. 14.

Input monitor 412 and button filter 413 have been described above as separate devices in order to more clearly describe the structure and function of each device. However, implementations of an input monitor and button filter according to aspects of the present invention may include combining elements of the two devices. For example, a data processing device such as device 1301 in FIG. 13 may function to buffer data representations of the incoming game command input signals transmitted from a player's game controller, and the buffered data representations may be used both for the processing steps for the input monitor and for the button filter. That is, the buffered data representations may be stored and processed as shown for example at process blocks 1205 through 1212 in FIG. 12, and also may be used in the process shown at process blocks 1405 of the example process shown in FIG. 14. In these implementations, the processing device 1301 in FIG. 3 may be operable to perform all of the process steps shown in FIG. 14 and the process steps 1201 and 1203 in the example process of FIG. 12. Other implementations may use a single processing device to perform the functions of processing device 1110 in FIG. 11 and processing device 1301 in FIG. 13.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination. Also, although the above description refers to the evaluation of a video signal from a game to determine a result or setup state of the game, the audio signal of a game may also be evaluated to determine or to aid in determining a result or setup state of the game.

The invention claimed is:

1. A method including:
   (a) receiving game command input signals on a game controller signal input path to a gaming device, the game command input signals comprising signals associated with a player and operable for controlling play in a tournament video game for the player while the player participates in a tournament against other players;
   (b) splitting the game command input signals from the game controller signal input path onto a signal monitoring path;
   (c) storing game command data representing the game command input signals from the signal monitoring path in a command data storage system;
   (d) evaluating two or more game control aspects associated with the game command data to produce a respective automation probability for each game control aspect;
   (e) combining the respective automation probability for each game control aspect to produce an overall automation probability value indicating a probability that the player is using automation to assist playing in the tournament; and
   (f) modifying a participation status of the player in response to a characteristic of the overall automation probability value.

2. The method of claim 1 wherein the characteristic of the overall automation probability value comprises a relationship between the overall automation probability value and a threshold value.

3. The method of claim 1 wherein modifying the participation status of the player includes disqualifying the player for the video game in which the game command input signals were received.

4. The method of claim 1 wherein modifying the participation status of the player includes disqualifying the player for a future instance of the video game in which the game command input signals were received.

5. The method of claim 1 wherein the two or more game control aspects associated with the game command data are selected from the group consisting of input speed, rate of input mistakes, variance between inputs, and input timing.

6. The method of claim 1 wherein evaluating two or more game control aspects associated with the game command data includes evaluating input speed, rate of input mistakes, variance between inputs, and input timing.

7. An input monitor for a video gaming system, the input monitor including:
 (a) a signal splitter connected in a game controller input signal path between a game controller input point and an input port of a gaming device, the signal splitter operable to direct game command input signals for a tournament video game on the game controller input signal path onto a signal monitoring path while a player participates in a tournament against other players;
 (b) a data storage device operatively connected to store game command data representing the game command input signals from the signal monitoring path;
 (c) two or more evaluation units operatively connected to read the game command data stored on the data storage device, each evaluation unit operable to evaluate a respective game control aspect associated with the game command data and to produce a respective automation probability for the respective game control aspect indicating a probability that the player is using automation to assist playing in the tournament; and
 (d) a probability combination unit operatively connected to receive the respective automation probability for each respective game control aspect, the probability combination unit operable to combine the respective automation probability for each game control aspect to produce an overall automation probability value.

8. The input monitor of claim 7 wherein each of the two or more evaluation units is operable to evaluate a respective game control aspect selected from the group consisting of input speed, rate of input mistakes, variance between inputs, and input timing.

9. The input monitor of claim 7 wherein game control aspects evaluated by the two or more evaluation units comprise input speed, rate of input mistakes, variance between inputs, and input timing.

10. A program product comprising one or more non-transitory computer readable data storage devices storing program code, the program code including:
 (a) game command data storage program code executable to receive game command input signals comprising signals taken from a game controller signal input path to a gaming device for a tournament video game while a player participates in a tournament against other players and to store game command data representing the game command input signals;
 (b) evaluation program code executable to evaluate two or more game control aspects associated with the game command data to produce a respective automation probability for each game control aspect indicating a probability that the player is using automation to assist playing in the tournament; and
 (c) combination program code executable to combine the respective automation probability for each game control aspect to produce an overall automation probability value.

11. A method including:
 (a) receiving a game command input signal in a video game conducted on a video gaming device, the game command input signal representing a command input defined by the video game as a valid input at a time at which the game command input signal is received;
 (b) determining if the command input is included in a set of prohibited inputs for the video game at the time at which the game command input signal is received, the set of prohibited inputs being defined by a system external to the video gaming device;
 (c) transmitting a replicated signal corresponding to the input signal to the video gaming device when the command input is not included in the set of prohibited inputs for the video game at the time at which the input signal is received; and
 (d) when the command input is included in the set of prohibited inputs for the video game at the time at which the input signal is received, storing a record of the command input represented by the input signal without causing a command for the command input to be executed or transmitting a signal corresponding to the input signal to the video gaming device, thereby preventing the command input from being executed at the video gaming device.

12. The method of claim 11 wherein determining if the command input is included in the set of prohibited inputs includes:
 (a) storing data representing the command input in a memory device; and
 (b) comparing the stored data representing the command input to a first set of command input records.

13. The method of claim 12 further including:
 (a) storing in a data storage system the first set of command input records and a second set of command input records, the first set of command input records being associated with a first state of the video game and the second set of command input records being associated with a second state of the video game; and
 (b) wherein the first set of command inputs records is selected for comparing to the stored data representing the command input in response to the video game being in the first state.

14. The method of claim 13 further including:
 (a) receiving an additional input signal in the course of the video game conducted on the video gaming device, the additional input signal representing an additional command input defined by the video game as a respective valid input at a time at which the additional input signal is received;
 (b) determining if the additional command input is included in a respective set of prohibited inputs for the video game at the time at which the input signal is received, the respective set of prohibited inputs being defined by the system external to the video gaming device;
 (c) transmitting an additional replicated signal corresponding to the additional input signal to the video gaming device in the event the additional command input is not included in the respective set of prohibited inputs for the video game at the time at which the additional input signal is received;

(d) in the event the command input is included in the set of prohibited inputs for the video game at the time at which the additional input signal is received, storing a record of the additional command input represented by the additional input signal without causing a command for the command input to be executed or transmitting a signal corresponding to the additional input signal to the video gaming device; and (e) wherein the video game is in the second state at the time the additional input is received and determining if the additional command input is included in the set of prohibited inputs includes (i) storing data representing the additional command input in the memory device, and (ii) comparing the stored data representing the additional command input to the second set of command input records.

* * * * *